(12) United States Patent
Taoka et al.

(10) Patent No.: US 9,332,061 B2
(45) Date of Patent: May 3, 2016

(54) MASTER DEVICE, INTEGRATED SERVICE MANAGEMENT SYSTEM, AND INTEGRATED SERVICE MANAGEMENT METHOD

(71) Applicant: PANASONIC INTELLECTUAL PROPERTY CORPORATION OF AMERICA, Torrance, CA (US)

(72) Inventors: Yuki Taoka, Kyoto (JP); Keiichi Tanaka, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 200 days.

(21) Appl. No.: 13/880,504

(22) PCT Filed: Oct. 26, 2012

(86) PCT No.: PCT/JP2012/006896
§ 371 (c)(1),
(2) Date: Apr. 19, 2013

(87) PCT Pub. No.: WO2013/076920
PCT Pub. Date: May 30, 2013

(65) Prior Publication Data
US 2014/0115025 A1  Apr. 24, 2014

(30) Foreign Application Priority Data

Nov. 25, 2011  (JP) ................................. 2011-258044

(51) Int. Cl.
*G06F 15/16* (2006.01)
*H04L 29/08* (2006.01)
*H04W 4/00* (2009.01)

(52) U.S. Cl.
CPC ................ *H04L 67/10* (2013.01); *H04L 67/16* (2013.01); *H04L 67/303* (2013.01); *H04L 67/34* (2013.01); *H04W 4/001* (2013.01)

(58) Field of Classification Search
CPC .......... H04L 67/10; G06F 9/542; G06F 9/445
See application file for complete search history.

(56) References Cited

U.S. PATENT DOCUMENTS 8,118,679 B2 * 2/2012 Gagner ........................... 463/42
2001/0002914 A1  6/2001 Aramoto
(Continued)

FOREIGN PATENT DOCUMENTS

| JP | 2001-222500 | 8/2001 |
| JP | 2005-500714 | 1/2005 |
| JP | 2005-275617 | 10/2005 |

OTHER PUBLICATIONS

International Search Report issued Dec. 18, 2012 in International (PCT) Application No. PCT/JP2012/006896.
(Continued)

*Primary Examiner* — Douglas Blair
(74) *Attorney, Agent, or Firm* — Wenderoth, Lind & Ponack, L.L.P.

(57) ABSTRACT

A device information acquisition unit acquires device information from a peripheral device via an ad hoc network. An integrated service determination unit determines an integrated service to be executed from among the integrated services defined by integrated service information based on an instruction from a user. A distribution script determination unit cross checks device information related to a client device and a specification requirement of the integrated service to be executed, and determines a client UI of the client device. A script distribution unit distributes, to each client device, the client UI that has been determined by the distribution script determination unit.

15 Claims, 15 Drawing Sheets

(56) References Cited

U.S. PATENT DOCUMENTS

| | | |
|---|---|---|
| 2002/0151294 A1 | 10/2002 | Kirby et al. |
| 2002/0151321 A1 | 10/2002 | Winchell et al. |
| 2003/0217135 A1* | 11/2003 | Chatani et al. ............... 709/223 |
| 2004/0002305 A1* | 1/2004 | Byman-Kivivuori et al. ............... 455/41.2 |
| 2005/0228853 A1 | 10/2005 | Yamamura et al. |
| 2006/0253592 A1* | 11/2006 | Oashi et al. ............... 709/227 |
| 2011/0016171 A1* | 1/2011 | Kim et al. ............... 709/203 |
| 2012/0016951 A1* | 1/2012 | Li et al. ............... 709/217 |
| 2012/0084364 A1* | 4/2012 | Sivavakeesar ............... 709/205 |
| 2012/0198483 A1* | 8/2012 | Jin et al. ............... 719/330 |
| 2013/0067065 A1* | 3/2013 | Navasivasakthivelsamy et al. ............... 709/224 |
| 2014/0075472 A1* | 3/2014 | Mitsuya et al. ............... 725/32 |

OTHER PUBLICATIONS

[online] Website of Apple Inc., [searched on Nov. 2, 2011], internet <http://www.apple.com/jp/ipad/features/airplay.html>.

[online] Website of Apple Inc., [searched on Nov. 2, 2011], internet <http://www.apple.com/jp/ipodtouch/features/airplay.html>.

* cited by examiner

FIG. 2

DEVICE INFORMATION 2011

| CATEGORY | ELEMENT | VALUE |
|---|---|---|
| IDENTIFIER | DEVICE IDENTIFIER (UDN) | aaaa-bbbb-cccc |
| INFORMATION TO BE PRESENTED TO USER | ICON (icon url) | abc/icon012.png |
| | DEVICE NAME (friendly Name) | abc-tablet |
| | BRIEF DESCRIPTION (model Description) | share use tablet |
| TYPE/FUNCTION INFORMATION OF DEVICE | DEVICE TYPE (device Type) | MediaServer |
| | MANUFACTURER (manufacturer) | ABC |
| | MODEL NAME (model Name) | EFG |
| | MODEL NUMBER (model Number) | 012 |
| | INSTALLED OS (OS) | Android |
| | RESOLUTION (resolution) | 321-900px (tablet) |
| | SUPPORT FUNCTION (support_function) | -DEVICE COORDINATION CLIENT-SIDE FUNCTION -TOUCH OPERATION |

FIG. 4

INTEGRATED SERVICE INFORMATION

INTEGRATED SERVICE LIST 4001

| SERVICE ID | SERVICE VERSION | SERVICE NAME | Description | UI APPLICATION LIST |
|---|---|---|---|---|
| S001 | V03 | PHOTO EXCHANGE | | ● |
| S002 | V02 | TRAVEL PLAN | | |
| S003 | V01 | SOCCER GAME | | |

UI APPLICATION LIST 4002

| INFORMATION OF UI APPLICATION | | | SPECIFICATION REQUIREMENTS | | | | | |
|---|---|---|---|---|---|---|---|---|
| ID | UI TYPE | FILE PATH | DEVICE TYPE | MANUFACTURER NAME | OS | RESOLUTION | SUPPORT FUNCTION | |
| S001 -V03 -APP01 | Master_UI | S001/V03/APP01 master_index.html | Media Server | COMPANY P | OS_A | 0-320px (smart phone) | -DEVICE COORDINATION MASTER-SIDE FUNCTION -TOUCH OPERATION | 4021 |
| S001 -V03 -APP02 | Client_UI | S001/V03/APP02 master_index.html | | | OS_A | 321-900px (tablet) | -DEVICE COORDINATION CLIENT-SIDE FUNCTION -TOUCH OPERATION | 4022 |
| S001 -V03 -APP03 | Client_UI | S001/V03/APP03 master_index.html | | | OS_i | 0-320px (smart phone) | -DEVICE COORDINATION CLIENT-SIDE FUNCTION -TOUCH OPERATION | 4023 |

MASTER DEVICE, INTEGRATED SERVICE MANAGEMENT SYSTEM, AND INTEGRATED SERVICE MANAGEMENT METHOD

TECHNICAL FIELD

The present invention relates to technology of integrated services in which devices, which are connected via a network, communicate and coordinate with each other to implement services.

BACKGROUND ART

In recent years, sophisticated terminals such as smartphones and tablet terminals for individual users are becoming popular. These terminals are equipped with a platform such as Android (Android: registered trademark) or iOS, and comprise an environment which enables the user to download and execute various applications.

Consequently, anticipated is the increase in use of integrated services of providing services to users by connecting a plurality of devices at various locations, whether indoor or outdoor, and causing the respective devices to coordinate with each other.

As conventional technology of realizing integrated services by distributing an application to a plurality of devices, known is, for example, the following conventional technology.

For instance, Non-Patent Documents 1 and 2 disclose technology referred to as "Airplay" provided by Apple Inc. in which a tablet terminal or a smartphone is caused to coordinate with a TV, and contents are displayed on the TV based on the operation of the tablet terminal or the smartphone. With this technology, the integrated service is realized by individually installing in advance a dedicated application, which configures an integrated service in which the combination of devices is fixed, in the respective devices, and executing the installed application.

Patent Document 1 discloses technology of a network gateway receiving a program from a program distribution site according to a program update request from the program distribution site or a request from the respective devices connected thereunder, and distributing the received program to the respective devices.

Nevertheless, with the technology of foregoing Non-Patent Documents 1 and 2, (1) there is a problem in that the integrated service cannot be provided to a device other than devices of a fixed combination in which the combination is known in advance; for instance, the combination of a tablet terminal and a TV. Moreover, (2) it is necessary to install, from an external network with an access point for connecting to the internet or the like, the application for realizing the integrated service in the respective devices to execute the integrated service.

Accordingly, with the technology of Non-Patent Documents 1 and 2, when the integrated service is to be realized using an ad hoc network (autonomous distributed network) in which the devices communicate with each other without going through an access point, there is a problem in that the integrated service cannot be realized unless the application for realizing the integrated service has been installed in the respective devices.

Moreover, with the technology of Patent Document 1, since the application cannot be distributed to the respective devices without going through the gateway, under an environment where the respective devices cannot be connected to a gateway, there is a problem in that the application cannot be distributed to the respective devices.

Thus, even if the application for executing the integrated service is once installed in the respective devices, when those devices are connected via an ad hoc network, there is a problem in that the integrated service cannot be executed if there is any inconsistency in the version or the like of the application that was installed in the respective devices.

Patent Document 1: Japanese Patent Application Publication No. 2001-222500

Non-Patent Document 1: [online] Website of Apple Inc., [searched on Nov. 2, 2011], internet <http://www.apple.com/jp/ipad/features/airplay.html>

Non-Patent Document 2: [online] Website of Apple Inc., [searched on Nov. 2, 2011], internet <http://www.apple.com/jp/ipodtouch/features/airplay.html>

SUMMARY OF THE INVENTION

An object of this invention is to provide technology capable of realizing an integrated service in an autonomous distributed network.

The master device according to one mode of the present invention is a master device which manages, on an autonomous distributed network, an integrated service that is executed by causing a plurality of devices to coordinate with each other, this master device including: an integrated service information management unit which manages, in relation to a plurality of integrated services, integrated service information that defines information pertaining to an application required by the devices for executing the respective integrated services and a specification requirement of the devices required for executing the application; a device information acquisition unit which acquires device information that defines a specification for a peripheral device from one or more peripheral devices detected via the autonomous distributed network; a connection management unit which determines, among the peripheral devices, one or more client devices to be used in the integrated service, and establishes a network connection with the determined client device, an integrated service determination unit which determines, among the integrated services defined by the integrated service information; an integrated service to be executed based on an instruction from a user; an application determination unit which determines an application of the client device based on the device information related to the client device and the specification requirement of the integrated service to be executed; an application distribution unit which distributes, to the client device, the application determined by the application determination unit; and an integrated service life cycle management unit which issues, to the client device, an start command of the application distributed by the application distribution unit.

BRIEF DESCRIPTION OF THE DRAWINGS

FIG. 2 is a diagram showing an example of the device information that the device information acquisition unit acquires from a peripheral device.

FIG. 4 is a diagram showing an example of the integrated service information that is managed by the integrated service information management unit.

FIG. 10 is a set of diagrams showing an example of the screen transition that is displayed on the display of the master device when the user selects the integrated service, wherein FIG. 10A shows a case where there are two devices (devices A and B) as the client devices, and FIG. 10B shows a case where there are three devices (devices A to C) as the client devices.

DETAILED DESCRIPTION OF INVENTION

Embodiments of the present invention are now explained with reference to the drawings. Note that the drawings are used for explaining the technical features that may be adopted by the present invention, and are merely explanatory examples without any intention of limiting the described configuration, processing and other matters of devices, unless such limitation is specifically described herein.

(Embodiment 1)

The integrated service management system according to Embodiment 1 of the present invention establishes an autonomous distributed network with peripheral devices under an environment with no access point for connecting to an external network, and realizes an integrated service by distributing, to each device, an application which complies with the specification (performance) of the respective devices. Here, an autonomous distributed network is a network which realizes linked communication without depending on an access point or a base station where multiple terminals function in the same manner as a router in an autonomously distributed manner and, for example, an ad hoc network corresponds to the autonomous distributed network.

(Explanation of Configuration)

Figure 1:
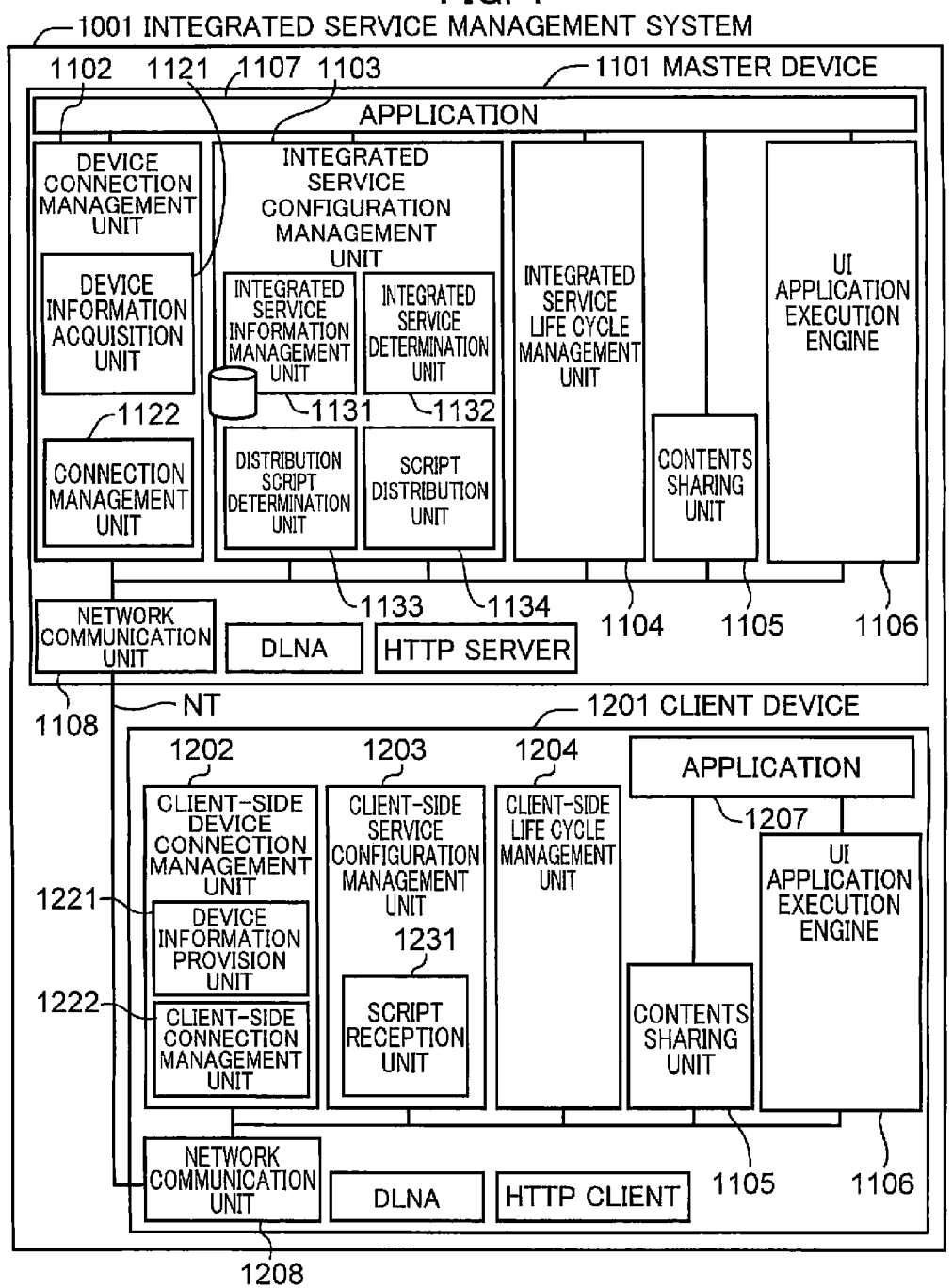
FIG. 1 is a functional block diagram showing an example of the integrated service management system in Embodiment 1 of the present invention.

FIG. 1 is a functional block diagram showing an example of the integrated service management system 1001 in Embodiment 1 of the present invention. The integrated service management system 1001 comprises a master device 1101 and a client device 1201.

The integrated service management system 1001 is realized by a plurality of devices that execute an integrated service while communicating with each other. As an example of an integrated service, there is a service of the master device 1101 and one or more client devices 1201 dividing and displaying one image.

A device that executes an integrated service comprises hardware, as with a smartphone, a tablet terminal, a TV or a recorder, a processing unit (not shown) such as a CPU, a memory for storing programs, a recording medium such as a hard disk, and a communication device (not shown) for establishing a network connection or performing network communication. In addition, a device that executes an integrated service realizes a network connection function by causing the processing unit to execute the programs recorded in the recording medium. Moreover, a device that executes an integrated service can execute various types of processing based on operations from a user made on the displayed operation screen, or operations from other network-connected devices.

Moreover, the programs recorded in the recording medium are, for example, programs for realizing the processing of sequences described later in this embodiment, and the operation of elements configuring the device to execute the integrated service.

Moreover, rather than causing the CPU to execute the programs recorded in the recording medium, it is also possible to use an integrated circuit to configure the operations that can be realized by causing the CPU to execute the programs. As a result of adopting the configuration of using an integrated circuit, there is no need to record the corresponding programs in the recording medium.

A device that executes an integrated service is equipped with a master-side function and/or a client-side function. Upon executing the integrated service, one device executes the master-side function and becomes the master device 1101, and the other one or more devices execute the client-side function and become the client devices 1201.

The master device 1101 and the client device 1201 are connected via a network NT. In this embodiment, explained as the network NT is a wireless network such as WiFi (registered trademark) or WiFi Direct. However, these are merely examples, and, as the network NT, a wired network may be adopted or another wireless network other than WiFi (registered trademark) and WiFi Direct may also be used, or a network in which a wired network and a wireless network coexist may also be used.

The WiFi standard is defined, for example, in WiFi Alliance. In WiFi Alliance, an infrastructure mode of the device communicating via an access point (AP), and an ad hoc mode of the devices communicating directly are defined. When the master device 1101 and the client device 1201 select the ad hoc mode, the network NT becomes the ad hoc network.

The master device 1101 determines the client device 1201 with which a network connection is to be established among the peripheral devices, sends a connection request to the determined client device 1201, determines an application (hereinafter referred to as a "UI (user interface) application") for executing the integrated service, distributes the determined UI application to the client device 1201, and commands the client device 1201 to execute the UI application.

The client device 1201 determines its participation in the ad hoc network upon receiving the connection request from the master device 1101, receives the UI application distributed from the master device 1101, receives a command from the master device 1101, and starts the received UI application.

(Outline of Functions of Master Device 1101)

The master device 1101 comprises the following functions (1) to (5).

(1) A function of managing, in relation to a plurality of integrated services, integrated service information (refer to FIG. 4) that defines information pertaining to the UI application required by the respective devices for executing the respective integrated services and a specification requirement of the respective devices required for executing the UI application.

(2) A function of cross checking the specification requirement defined by the integrated service information and the device information of the peripheral device, extracts the executable integrated services, presenting a list of the extracted integrated services to the user, determining the integrated service to be executed based on instructions from the user, and starting the master-side UI application for executing the determined integrated service.

(3) A function of presenting the device information of the peripheral device to the user, determining the client device 1201 to be coordinated, sending a connection request to the determined client device 1201, and establishing a network connection.

(4) A function of cross checking the specification requirement of the device required for executing the UI application and the device information of the client device 1201, and determining the UI application to be distributed to the client device 1201.

(5) A function of distributing the UI application to the client device 1201 and issuing a start command.

(Outline of Functions of Client Device 1201)

The client device 1201 comprises the following functions (1) and (2).

(1) A function of receiving the connection request from the master device 1101 and participating in the network of the integrated service.

(2) A function of receiving the UI application distributed from the master device 1101, receiving the start command from the master device, and starting the received UI application.

The configuration of the master device 1101 and the client device 1201 shown in FIG. 1 is now explained in detail.

(Explanation of Master Device 1101)

The master device 1101 comprises a device connection management unit 1102, an integrated service configuration management unit 1103, an integrated service life cycle management unit 1104, a contents sharing unit 1105, a UI application execution engine 1106, an application 1107, and a network communication unit 1108.

The device connection management unit 1102 comprises a device information acquisition unit 1121 and a connection management unit 1122. The device information acquisition unit 1121 acquires device information from the peripheral device via an ad hoc network. Moreover, the device information acquisition unit 1121 acquires device information from the peripheral device according to a request from the respective constituent elements of the master device 1101, and provides the acquired device information to the respective constituent elements.

FIG. 2 is a diagram showing an example of the device information that the device information acquisition unit 1121 acquires from a peripheral device. As shown in FIG. 2, the device information comprises columns 2011 to 2013.

The column 2011 indicates the category name of the device information. The column 2012 indicates the name of the respective elements of the device information. The column 2013 indicates the value of the respective elements. A line 2001 indicates the device identifier. The device identifier is information for uniquely identifying the device. For instance, a UDN (Unique Device Name) is used as the device identifier.

Lines 2002 to 2004 indicate the information to be presented to the user, and indicates information that can be visually recognized by a person. Specifically, each of the lines 2002 to 2004 indicates an icon (icon url), device name (friendly Name), and brief description (model Description).

Lines 2005 to 2011 indicate the type/function information of the device. As the type/function information of the device, indicated is information that can be interpreted by the master device 1101, and which is used for determining the device to be connected, determining the integrated service, and determining the UI to be distributed. Specifically, as the type/function information of the device, included are a device type (device Type), manufacturer (manufacturer), model name (model Name), model number (model Number), installed OS (OS), resolution (resolution), and support function (support_function).

As the respective elements of lines 2001 to 2008, device description (Device description) information defined by UPnP (Universal Plug and Play) is adopted. The device information shown in FIG. 2 indicates, in addition to the foregoing device description information, the elements of installed OS, resolution and support function shown in lines 2009 to 2011. The installed OS shows the name of the operating system that is installed in the device. The resolution shows the resolution of the display of the device. The support function shows the function supported by the device such as whether that device comprises a client function, comprises a master function, or comprises a touch operation function.

Note that, as the device information, other information may also be adopted so as long as it is information that can be used for determining the device to be connected, determining the integrated service, and determining the UI application to be distributed.

Returning to FIG. 1, when the device information acquisition unit 1121 is to acquire device information from a peripheral device with which a network connection has not been established, for example, the device information may be acquired by using a protocol such as a device search or a service search defined by WiFi Direct.

Moreover, when the device information acquisition unit 1121 is to acquire device information from a peripheral device with which a network connection has not been established, for example, the device information may be acquired using a protocol such as a device search or a service search defined by WiFi Direct, or a protocol such as Device discovery defined by UPnP.

Note that, as the protocol for acquiring the device information, any protocol may be used so as long as it is a protocol capable of acquiring the foregoing device information and which is a protocol that is common among the devices configuring the integrated service management system 1001.

The connection management unit 1122 determines the client device 1201 among the peripheral devices, sends a connection request to the client device 1201, and establishes a network connection according to a response from the client device 1201.

Note that the connection management unit 1122 may establish the network connection with the client device 1201 by using, for example, a protocol defined by WiFi Direct.

The integrated service configuration management unit 1103 comprises an integrated service information management unit 1131, an integrated service determination unit 1132, a distribution script determination unit 1133 (example of the application determination unit), and a script distribution unit 1134 (example of the application distribution unit).

The various terms used in Embodiment 1 of the present invention are now explained. An integrated service is a service that is executed by a plurality of devices coordinating with each other, and is specifically a service that is realized by connecting one master device 1101 and one or more client devices 1201. In order to execute the integrated service, a UI application that is executed in the respective devices is required.

A UI application is an application for realizing the UI (user interface) in the respective devices configuring the integrated service. The UI application is described, for example, a script language such as Javascript (registered trademark). The UI application that is started by the master device 1101 is referred to as a master UI (Master UI, example of a master application), and the UI application that is started by the client device 1201 is referred to as a client UI (Client UI, example of a client application).

A master UI is the application that is first started after the integrated service is selected in the master device 1101. The master UI performs the processing of establishing a network connection of the client device 1201 and the master device 1101 and building a network, and the processing of distributing the client UI to the client device 1201 and issuing a command for starting the distributed client UI.

A client UI is an application that is started in the client device 1201 upon receiving a start command from the master device 1101.

Otherwise, in this embodiment, there is a service select UI (Service Select UI) as a UI application that is independent from the integrated service. The service select UI is an application that is executed in the master device 1101 when there are a plurality of integrated services, and is an application for selecting one integrated service to be executed among the plurality of integrated services.

Figure 3:
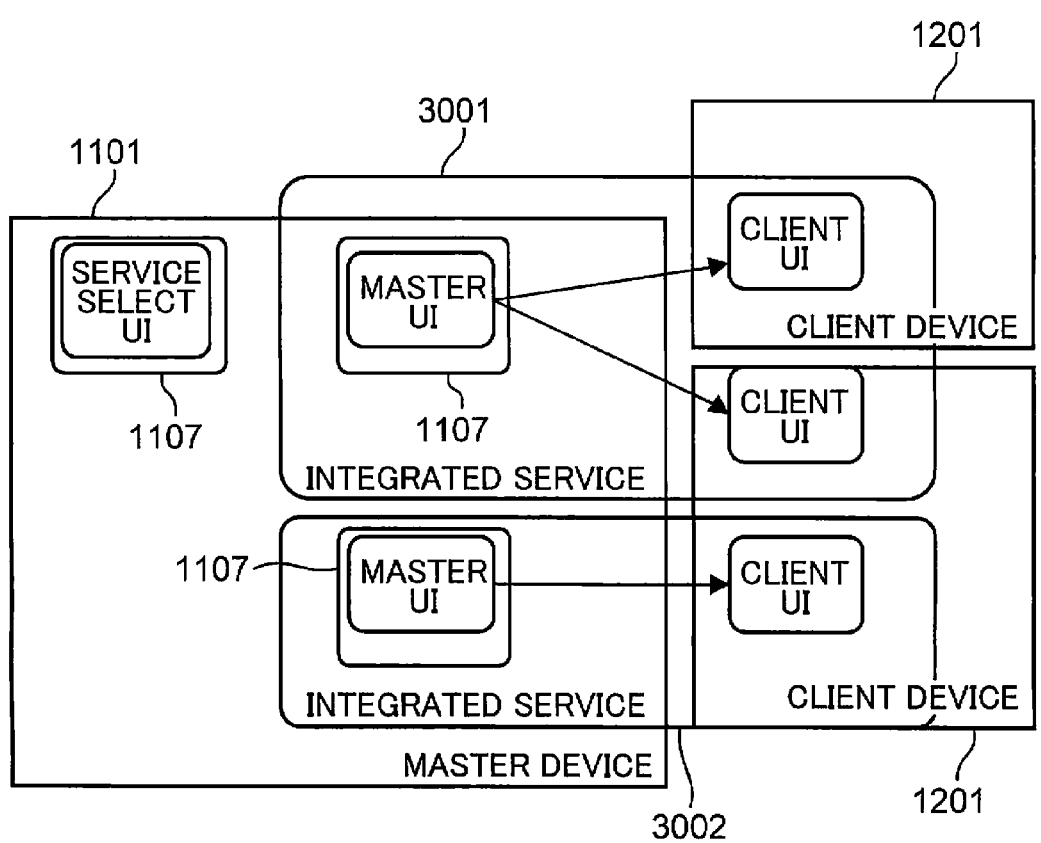
FIG. 3 is a schematic diagram showing an example of the integrated service configuration in Embodiment 1 of the present invention.

FIG. 3 is a schematic diagram showing an example of the integrated service configuration in Embodiment 1 of the present invention. The integrated service information management unit 1131 manages one service select UI, a plurality of integrated services, and a UI application (master UI or client UI) that configures the respective integrated services.

The master device 1101 initially starts the service select UI, and, when the service select UI selects the integrated service, starts the master UI configuring the selected integrated service. In FIG. 3, the master device 1101 comprises two integrated services 3001, 3002. The integrated service 3001 is an integrated service that is performed by the master device 1101 and two client devices 1201. The integrated service 3002 is an integrated service that is performed by the master device 1101 and one client device 1201.

For example, when the service select UI selects the integrated service 3001 based on instructions from the user, the master UI of the integrated service 3001 is started. Meanwhile, when the service select UI selects the integrated service 3002 based on instructions from the user, the master UI of the integrated service 3002 is started.

Note that when there is only one integrated service, the master device 1101 may directly start the master UI configuring the integrated service without starting the service select UI.

The master UI, the client UI, and the service select UI respectively configure the application 1107, and are realized by the script data being decoded by the UI application execution engine 1106.

Returning to FIG. 1, the integrated service information management unit 1131 manages the integrated service information shown in FIG. 4. FIG. 4 is a diagram showing an example of the integrated service information that is managed by the integrated service information management unit 1131. The integrated service information comprises an integrated service list 4001 and a UI application list 4002.

The integrated service list 4001 is a table for storing information related to the integrated services that are executable by the master device 1101, and comprises the fields of service ID, service version, service name, description (Description), and UI application list.

The service ID field stores the identification code that is uniquely assigned to each integrated service. The service version field stores the version name of each integrated service. The service name field stores the name of each integrated service. The description field stores the character string which describes the brief explanation of each integrated service. The UI application list field stores the UI application list 4002 of each integrated service.

The UI application list 4002 is a table comprising a field of the information of the UI application that is required by the master device 1101 and the client device 1201 upon executing the integrated service, and a field of the specification requirement of the device required upon executing each UI application.

The UI application information field is further separated into the fields of ID, UI type (UI Type), and file path (File path). The ID field stores the identification code that is uniquely assigned to each UI application.

The UI type field stores the information showing whether the UI application is a master UI or a client UI. In the example of FIG. 4, when the UI application is a master UI, "Master_UI" is stored in the UI type field, and when the UI application is a client UI, "Client_UI" is stored in the UI type field. The file path field stores the file path showing the storage location of each UI application.

The specification requirement field is further separated into the fields of device type (Device Type), manufacturer name (Manufacturer), OS, resolution, and support function. The device type field stores the type of device. The manufacturer name field stores the name of the device manufacturer. The OS field stores the name of the OS installed in the device. The resolution field stores the resolution of the device. For example, the resolution field of the line 4021 stores "0-320 px (smartphone)". This requires that, in order to execute the UI application of the line 4021, a smartphone having a resolution of 320 pixels or less is used.

The resolution field of the line 4022 stores "321-900 px (tablet)". This requires that, in order to execute the UI application of the line 4022, a tablet terminal having a resolution of 321 pixels or more and 900 pixels or less is used.

The support function field stores the functions of the device. For example, the support function field of the line 4021 stores "device integrated master-side function, touch operation". This requires that, in order to execute the UI application of the line 4021, a device capable of touch operation and which comprises the functions of the master device 1101 shown in FIG. 1 is used.

Moreover, the support function field of the line 4022 stores "device integrated client-side function, touch operation". This requires that, in order to execute the UI application of the line 4022, a device capable of touch operation and which comprises the functions of the client device 1201 shown in FIG. 1 is used.

Note that the integrated service information is not limited to the example shown in FIG. 4, and any information may be used so as long as it is information that can determine the integrated service to be executed and determine the UI application to be distributed to each device.

Returning to FIG. 1, the integrated service determination unit 1132 determines the integrated service to be executed based on instructions from the user among the integrated services defined by the integrated service information. Here, the integrated service determination unit 1132 may determine the integrated service by using the service determination methods 1 and 2 shown below.

(Service Determination Method 1)

The service determination method 1 is a method of the integrated service determination unit 1132 determining the integrated service before the connection management unit 1122 determines the client device 1201.

In the foregoing case, the integrated service determination unit 1132 extracts the executable integrated services by comparing the device information of the one or more peripheral devices acquired by the device information acquisition unit 1121, and the specification requirement defined by the integrated service information shown in FIG. 4. In addition, the integrated service determination unit 1132 issues a selection request to the application 1107 (service select UI) for selecting an integrated service among the extracted integrated services. The application 1107 presents the extracted integrated services to the user, and notifies the integrated service that was instructed by the user to the integrated service determination unit 1132. Subsequently, the integrated service determination unit 1132 determines the notified integrated service as the integrated service to be executed.

Specifically, the application 1107 displays, on a display device (not shown), a list of the integrated services that were extracted by the integrated service determination unit 1132. Subsequently, the application 1107 receives the integrated service that was instructed by the user through operation of an operating device (not shown). The application 1107 thereafter notifies the received integrated service to the integrated service determination unit 1132.

In the example of FIG. 4, the integrated service determination unit 1132 determines that the photo exchange service is the executable integrated service when device information which satisfies the specification requirement of the line 4022 or the line 4023 is acquired by the device information acquisition unit 1121.

In addition, the connection management unit 1122 compares the specification requirement of the integrated service to be executed and the device information of the peripheral device, and determines the client device 1201 to be used in the integrated service to be executed.

In the example of FIG. 4, when the photo exchange is determined as the integrated service to be executed, the connection management unit 1122 determines, as the client device 1201, the peripheral device having the device information which satisfies the specification requirement of the line 4022 or the line 4023.

In the foregoing case, when there are a plurality of peripheral devices that satisfy the specification requirement of the line 4022 or the line 4023, the connection management unit 1122 presents the peripheral devices to the user via the application 1107, and determines, as the client device 1201, the one or more peripheral devices selected by the user.

Specifically, the connection management unit 1122 sends a display request to the application 1107 for displaying a list of the plurality of peripheral devices that satisfy the specification requirement. Subsequently, the application 1107 displays the list of plurality of peripheral devices on a display device (not shown). In addition, the application 1107 receives the peripheral device that was instructed by the user through operation of an operating device (not shown). Subsequently, the application 1107 notifies the received peripheral device to the connection management unit 1122.

When the service determination method 1 is used, foremost, the executable integrated services are executed from the specification of the peripheral device. Subsequently, the user can select the integrated service to be executed among the extracted integrated services. Thus, it is possible to prevent situations where there is no peripheral device that satisfies the specification requirement of the integrated service selected by the user. Consequently, it is possible to avoid situations where the integrated service selected by the user cannot be executed.

(Service Determination Method 2)

The service determination method 2 is a method of the connection management unit 1122 foremost determining the client device 1201, and the integrated service determination unit 1132 thereafter determining the integrated service.

In the foregoing case, the connection management unit 1122 determines the client device 1201, for example, by presenting the device information of the peripheral device to the user, and receiving instructions for selecting the client device 1201 from the user.

In addition, the integrated service determination unit 1132 cross checks the device information of the client device 1201 and the specification requirement defined by the integrated service information, extracts the executable integrated services, presents the extracted integrated services to the user via the application 1107 (service select UI), and determines the integrated service to be executed based on instructions from the user.

Specifically, the integrated service determination unit 1132 sends a display request to the application 1107 for displaying a list of the extracted integrated services. Subsequently, the application 1107 displays a list of the integrated services on a display device (not shown). In addition, the application 1107 receives, as the integrated application to be executed, the integrated service that was instructed by the user through operation of an operating device (not shown).

Note that the integrated service determination unit 1132 may also notify the integrated service information to the application 1107, and entrust the determination of the integrated service to the application 1107. In the foregoing case, in the same manner as the integrated service determination unit 1132, the application 1107 may determine the integrated service to be executed by using the service determination method 1 or the service determination method 2.

The distribution script determination unit 1133 cross checks the device information of the client device 1201 and the specification requirement of the integrated service to be executed, and determines the client UI of the client device 1201. Here, the distribution script determination unit 1133 may determine the client UI by using the application determination methods 1 and 2 described below.

(Application Determination Method 1)

The application determination method 1 is a method of the distribution script determination unit 1133 independently determining the client UI by referring to the specification requirement of the integrated service information (refer to FIG. 4) and the device information of the client device 1201.

In the example of FIG. 4, let it be assumed that device information in which the OS is "OS_A", the resolution is "321-900 px (tablet)", and the support function is "integrated client-side function, touch operation" is acquired by the device information acquisition unit 1121.

In the foregoing case, the distribution script determination unit 1133 determines the client UI of the line 4022 as the client UI of the client device 1201 having the foregoing device information.

Here, let it be assumed that there are a plurality of client UI candidates of a certain client device 1201. For example, let it be assumed that device information in which the OS is "OS_A", the resolution is "321-900 px (tablet)", and the support function is "device integrated client-side function, touch operation" is acquired by the device information acquisition unit 1121, and two or more types of client UI that satisfies the foregoing specification requirement are described in FIG. 4. In the foregoing case, the client device 1201 having the foregoing device information will have a plurality of client UI candidates.

In the foregoing case, the distribution script determination unit 1133 sends a determination request to the application 1107 (master UI) for determining the client UI. Consequently, the application 1107 presents a plurality of client UI candidates to the user, and determines, as the client UI to be distributed, the client UI that was selected by the user.

Here, the application 1107 displays a list of the plurality of client UI candidates on a display device (not shown). Subsequently, the application 1107 determines, as the client UI selected by the user, the client UI that was instructed by the user through operation of an operating device (not shown).

Note that the application 1107 may also determine one client UI according to a predetermined reference, which was set forth independently by the application 1107, among the plurality of client UI candidates.

As the predetermined reference, a predetermined reference may be used according to the purpose or use of the integrated service, or the user's preference. When there are a plurality of client UI candidates as described above, by entrusting the determination of the client UI to the application 1107, it is possible to determine the client UI that is compliant with the reference of the application 1107, and flexibly determine the client UI.

(Application Determination Method 2)

The application determination method 2 is a method of the distribution script determination unit 1133 notifying the integrated service information to the application 1107 (master UI), and entrusting the determination of the client UI of each client device 1201 to the application 1107. In the foregoing case, the application 1107 determines the client UI by using the method explained in the application determination method 1; that is, the same method as the method of the distribution script determination unit 1133 determining the client UI. As a result of entrusting the determination of the client UI to the application 1107 as described above, for example, when there are a plurality of client UI candidates of a certain client device 1201, one client UI can be determined without requiring any sending and receiving of data between the application 1107 and the distribution script determination unit 1133.

The script distribution unit 1134 distributes, to each client device 1201, the client UI that was determined by the distribution script determination unit 1133.

Specifically, the script distribution unit 1134 distributes, to each device, the script that was determined by the distribution script determination unit 1133 upon receiving a command from the application 1107 (service select UI or master UI).

More specifically, the script distribution unit 1134 provides an API (Application Program Interface) to the application 1107 for distributing the client UI, and distributes, to each client device 1201, the client UI that was determined by the distribution script determination unit 1133 as a result of the ID of the integrated service to be executed being designated by the application 1107. Here, the script distribution unit 1134 uses the distribution methods 1 and 2 to distribute the client UI.

(Distribution Method 1)

The distribution method 1 is a method of distributing the script data of the client UI to the client device 1201, and storing the script data in (in a local region of) a storage device of the client device 1201. In the foregoing case, when a start command of the client UI is issued, the client device 1201 starts the client UI stored in the local region.

(Distribution Method 2)

The distribution method 2 is a method of causing the master device 1101 to execute the function of an HTTP server, and sending, to the client device 1201, an URI (Uniform Resource Identifier) of the client UI retained in the master device 1101. In the foregoing case, when a start request of the client UI is issued, the client device 1201 starts the client UI by designating the URI of the client UI retained in the master device 1101.

In the case of the distribution method 1, for example, upon sending the script data of the client UI, the ID of the integrated service to be executed and the ID of the client UI are also sent to the client device 1201. Consequently, the client device 1201 can start the client UI by designating the ID of the integrated service and the ID of the client UI upon starting the client UI.

In the case of the distribution method 2, for example, the following three distribution methods 2-1 to 2-3 may be used.

(Distribution Method 2-1)

Upon sending the URI of the client UI, the script distribution unit 1134 also sends the ID of the integrated service to be executed and the ID of the client UI to the client device 1201.

Subsequently, upon starting the client UI, the integrated service life cycle management unit 1104 designates the ID of the integrated service to be executed or the ID of the client UI to be distributed, and issues a start command of the client UI to the client device 1201.

(Distribution Method 2-2)

While the script distribution unit 1134 does not send the ID of the integrated service to be executed and the ID of the client UI to be distributed upon sending the URI of the client UI, the integrated service life cycle management unit 1104 designates the URI of the client UI to be distributed and issues a start command of the client UI to the client device 1201 upon starting the client UI.

(Distribution Method 2-3)

The distribution method 2-3 is a method of integrating the process of sending the URI of the client UI and the process of issuing the start request of the client UI into a single process. In the foregoing case, the script distribution unit 1134 does not send the URI of the client UI, and the integrated service life cycle management unit 1104 designates the URI of the client UI and issues a start command of the client UI to the client device 1201.

Here, when the script reception unit 1231 of the client device 1201 takes on a configuration of retaining the received client UI even after the execution of the integrated service is terminated, the script distribution unit 1134 may adopt the following configuration.

In other words, the script distribution unit 1134 acquires the stored ID of the client UI and the version of the client UI from the script reception unit 1231 of the client device 1201, and determines whether the acquired ID and version of the client UI coincide with the ID and version of the client UI that as determined by the distribution script determination unit 1133. Subsequently, the script distribution unit 1134 may distribute the script data of the client UI upon determining that the ID and version of the client UI do not coincide. Meanwhile, the script distribution unit 1134 does not distribute the script data of the client UI upon determining that the ID and version of the client UI coincide.

The integrated service life cycle management unit 1104 controls the execution of the UI application configuring the integrated service.

Specifically, the integrated service life cycle management unit 1104 comprises the following functions.

(1) The integrated service life cycle management unit 1104 synchronously starts or synchronously terminates the master UI, and the client UI that was distributed to each client device 1201. In the foregoing case, when a service ID of the integrated service is designated by the master UI and the synchronous start or synchronous termination is commanded, the integrated service life cycle management unit 1104 synchronously starts or synchronously terminates the master UI and the client UI configuring the integrated service having the designated service ID.

(2) The integrated service life cycle management unit 1104 detects the termination of the client UI from one of the client devices 1201 executing the client UI configuring the integrated service.

(3) The integrated service life cycle management unit 1104 provides an API for synchronously starting and synchronously terminating the client UI, an API for acquiring the IP address of the client device 1201 that is executing the client UI, and an API for detecting the termination of the client UI.

Here, for synchronously starting the UI application configuring the integrated service, the following method may be adopted when the script distribution unit 1134 is to use the distribution method 1. In other words, the integrated service life cycle management unit 1104 may deliver the URI of the master UI to the UI application execution engine 1106 and issue a start command, and deliver the ID of the client UI to the client-side life cycle management unit 1204 of each client device 1201 and issue a start command.

Moreover, for synchronously starting the UI application configuring the integrated service, the following method may be adopted when the script distribution unit 1134 is to use the distribution method 2. In other words, the integrated service life cycle management unit 1104 may deliver the URI of the master UI to the UI application execution engine 1106 and issue a start command, and deliver the ID or URI of the client UI of the master device 1101 to the client-side life cycle management unit 1204 of each client device 1201 and issue a start command.

Moreover, for synchronously starting the UI application configuring the integrated service, the following method may be adopted when the script distribution unit 1134 is to use the distribution method 2-3. In other words, the integrated service life cycle management unit 1104 may deliver the URI of the master UI to the UI application execution engine 1106 and issue a start command, and deliver the URI of the client UI of the master device 1101 to the client-side life cycle management unit 1204 of each client device 1201 and issue a start command.

For synchronously terminating the UI application configuring the integrated service, the integrated service life cycle management unit 1104 may issue a termination command to the UI application execution engine 1106, and to the client-side life cycle management unit 1204 of each client device 1201.

The contents sharing unit 1105 provides a function of the master device 1101 sharing contents such as photos and videos with the client device 1201. The sharing of contents is realized, for example, by using the Content Directory Service of DLNA (Digital Living Network Alliance).

Moreover, the contents sharing unit 1105 realizes, between the master device 1101 and the client device 1201, the functions of contents listing (displaying the contents of the client device 1201 on the master device 1101), contents downloading (copying the contents of the client device 1201 to the master device 1101), and contents uploading (copying the contents of the master device 1101 to the client device 1201).

The UI application execution engine 1106 realizes the application 1107 when the URI as the location of the script data of the UI application, such as the master UI, executed by the master device 1101 is designated, and by loading the script data of the master UI from the designated URI.

Moreover, the UI application execution engine 1106 provides, to the application 1107, for example, an API of drawing and the like provided by a browser corresponding to HTML5, and an API provided by a PhoneGap.

The application 1107 is realized by the script data being loaded into the UI application execution engine 1106, and executes various types of processing by using the API provided by the device connection management unit 1102, the integrated service configuration management unit 1103, the integrated service life cycle management unit 1104, the contents sharing unit 1105, and the UI application execution engine 1106. In this embodiment, the service select UI and the master UI configuring the application 1107 are started by the UI application execution engine 1106.

The network communication unit 1108 is configured, for example, from a communication module corresponding to the ad hoc mode and the infrastructure mode, data to be sent is delivered thereto from the respective constituent elements configuring the master device 1101, sends the delivered data to the client device 1201, incorporates the data sent from the client device 1201, and supplies such data to the respective constituent elements. In addition, the master device 1101 comprises a function of sending and receiving data in compliance with DLNA and a function of starting the HTTP server.

Specifically, the master device 1101 incorporates data to be sent from the device information acquisition unit 1121, the connection management unit 1122, the integrated service determination unit 1132, the distribution script determination unit 1133, the script distribution unit 1134, the integrated service life cycle management unit 1104, the contents sharing unit 1105, and the UI application execution engine 1106.

(Explanation of Client Device 1201)

The client device 1201 comprises a client-side device connection management unit 1202, a client-side service configuration management unit 1203, a client-side life cycle management unit 1204, a contents sharing unit 1105, a UI application execution engine 1106, an application 1207, and a network communication unit 1208.

Since the contents sharing unit 1105 and the UI application execution engine 1106 of the client device 1201 comprise the same functions as the contents sharing unit 1105 and the UI application execution engine 1106 of the master device 1101, the explanation thereof is omitted.

The client-side device connection management unit 1202 comprises a device information provision unit 1221 and a client-side connection management unit 1222.

The device information provision unit 1221 returns the device information of the client device 1201 in response to a request from the device information acquisition unit 1121 of the master device 1101. The device information was described above with reference to FIG. 2.

The client-side connection management unit 1222 determines whether to connect to an ad hoc network upon receiving a connection request from the connection management unit 1122 of the master device 1101, and returns the determination result to the connection management unit 1122 of the master device 1101.

Here, the connection request sent from the master device 1101 to the client device 1201 and the response to the master device 1101 can be realized, for example, according to a protocol defined by WiFi Direct. Moreover, the determination on whether or not to establish the connection may be made, for example, by displaying the information of the master device 1101 that sent the connection request on a display device (not shown), asking the user whether to approve the connection request, and making the determination based on instructions from the user that were input through operation of an operating device (not shown).

The client-side service configuration management unit 1203 comprises a script reception unit 1231.

The script reception unit 1231 receives and records the client UI that was distributed from the script distribution unit 1134 of the master device 1101. Here, when the distribution method 1 is adopted, the script reception unit 1231 may record the script data of the client UI that is sent from the script distribution unit 1134.

Note that the script reception unit 1231 may delete the recorded script data upon the termination of the integrated service so that unneeded data is not accumulated.

Moreover, upon the distribution of the client UI from the script distribution unit 1134 of the master device 1101, the script reception unit 1231 may determine whether the ID and version of the client UI to be distributed coincide with the stored ID and version of the client UI, and store the client UI only when the ID and version coincide.

Moreover, the script reception unit 1231 returns the stored ID and version of the client UI in response to an inquiry from the script distribution unit 1134 of the master device 1101, and determines whether the ID and version of the client UI to be distributed to the script distribution unit 1134 coincide with the ID and version of the client UI stored in the client device 1201. In addition, the script reception unit 1231 may receive the client UI only when the ID and version do not coincide.

Moreover, the script reception unit 1231 may also acquire the ID and version of the client UI to be distributed from the script distribution unit 1134 of the master device 1101, determine whether the foregoing ID and version coincide with the stored ID and version of the client UI, and receive the client UI only when the ID and version do not coincide.

The client-side life cycle management unit 1204 receives a start command of the client UI from the integrated service life cycle management unit 1104 of the master device 1101, notifies, to the UI application execution engine 1106 of the client device 1201, the URI of the recording destination of the client UI received by the script distribution unit 1134, and starts the client UI.

Here, when the script reception unit 1231 adopts a configuration of storing the client UI after the integrated service is executed, the client-side life cycle management unit 1204 may adopt the following configuration.

In other words, the client-side life cycle management unit 1204 may also determine whether the service ID of the integrated service and the ID of the client UI delivered from the integrated service life cycle management unit 1104 of the master device 1101 and the service ID of the integrated service and the ID of the client UI received by the script reception unit 1231 coincide, and start the client UI when it is determined that the service ID of the integrated service and the ID of the client UI coincide.

Moreover, upon receiving a termination command of the client UI from the integrated service life cycle management unit 1104 of the master device 1101, the client-side life cycle management unit 1204 issues a termination command to the UI application execution engine 1106 of the client device 1201.

Moreover, the client-side life cycle management unit 1204 causes the IP address of the own device to be an argument upon terminating the client UI in the own device, and issues a termination notice of the client UI to the integrated service life cycle management unit 1104 of the master device 1101.

The application 1207 is realized by the UI application execution engine 1106 of the client device 1201 decoding the script data of the client UI, and executes various types of processing by using the API provided by the contents sharing unit 1105 and the UI application execution engine 1106 of the client device 1201.

The network communication unit 1208 is configured, for example, a communication module corresponding to the ad hoc mode and the infrastructure mode, data to be delivered is delivered thereto from the respective constituent elements configuring the client device 1201, sends the delivered data to the client device 1201, incorporates the data sent from the master device 1101, and supplies such data to the respective constituent elements. In addition, the client device 1201 comprises a function of sending and receiving data in compliance with DLNA, and a function of starting the HTTP client. The configuration of the master device 1101 and the client device 1201 in this embodiment was explained above.

Note that, in FIG. 1, the device connection management unit 1102, the integrated service configuration management unit 1103, the integrated service life cycle management unit 1104, the contents sharing unit 1105, and the UI application execution engine 1106 are configured from programs, and realized by being executed by the CPU.

Moreover, the integrated service information management unit 1131 configuring the integrated service configuration management unit 1103 is configured from a storage device such as a hard disk, and programs for controlling the storage device, and is realized by being executed by the CPU.

Moreover, the network communication unit 1108 is configured from a communication module and programs for controlling the communication module, and is realized by being executed by the CPU. Moreover, the foregoing programs are stored, in a storage device such as a hard disk not shown, as the master device program for causing the computer to function as the master device, and loaded into the CPU. The master device program is recorded in a computer-readable recording medium such as a DVD-ROM, and thereby provided to the user. Moreover, the master device program may also be retained in a server that is connected via a network, and provided to the user by causing the user to download such master device program.

Moreover, the blocks other than the application 1107 of the master device 1101 shown in FIG. 1 may also be configured from a dedicated hardware circuit. In the foregoing case, the respective blocks may be integrated on one chip to form an integrated circuit.

Moreover, in FIG. 1, the client-side device connection management unit 1202, the client-side service configuration management unit 1203, the client-side life cycle management unit 1204, the contents sharing unit 1105, and the UI application execution engine 1206 are configured from programs, and realized by being executed by the CPU. Moreover, the network communication unit 1108 is configured from a communication module and programs for controlling the communication module, and realized by being executed by the CPU. Moreover, the foregoing programs are stored, in a storage device such as a hard disk not shown, as the client device program for causing the computer to function as the client device, and loaded into the CPU. The client device program is recorded in a computer-readable recording medium such as a DVD-ROM, and thereby provided to the user. Moreover, the client device program may also be retained in a server that is connected via a network, and provided to the user by causing the user to download such client device program.

Moreover, the blocks other than the application 1207 of the master device 1101 shown in FIG. 1 may also be configured from a dedicated hardware circuit. In the foregoing case, the respective blocks may be integrated on one chip to form an integrated circuit.

(Explanation of Processing)

The processing flow of the integrated service management system 1001 in Embodiment 1 of the present invention is now explained. Here, the processing of determining the integrated service, establishing the network connection, determining the client UI, distributing the client UI, and executing the integrated service is explained.

Figure 5:
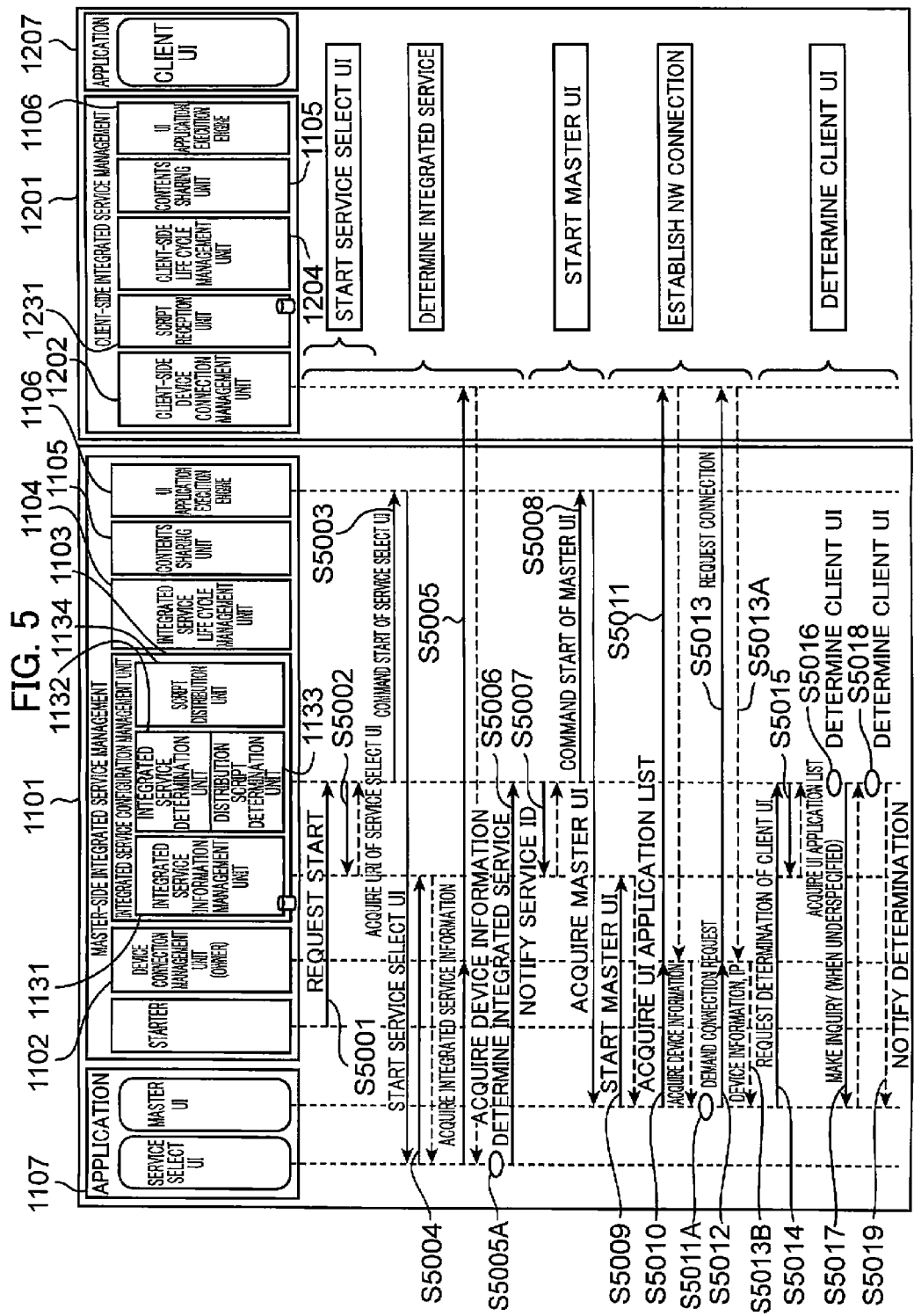
FIG. 5 is a sequence diagram showing an example of the processing from determining the integrated service, establishing the network connection, and determining the client UI.

FIG. 5 is a sequence diagram showing an example of the processing from determining the integrated service, establishing the network connection, and determining the client UI.

Figure 9:
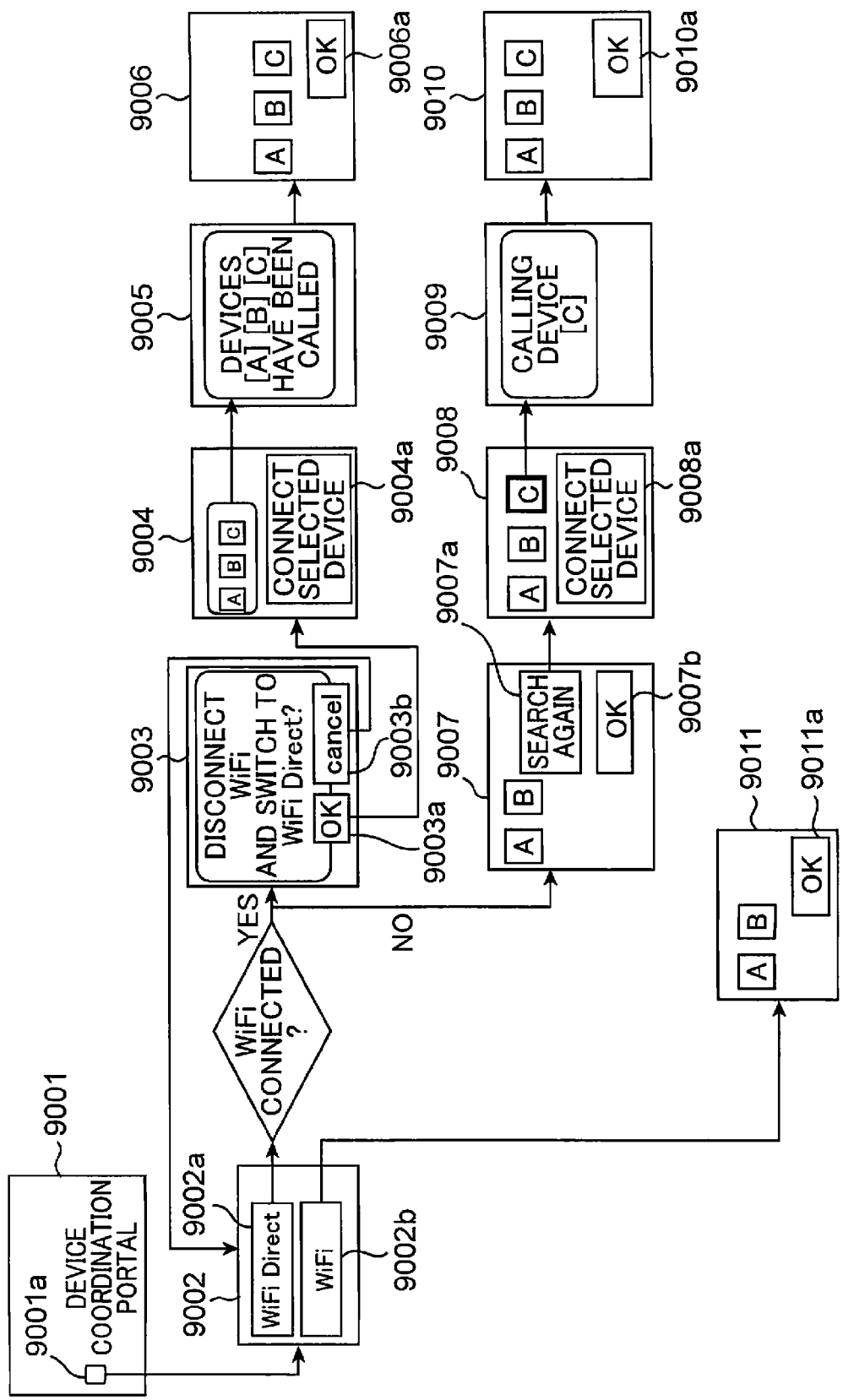
FIG. 9 is a diagram showing an example of the screen transition that is displayed on the display of the master device upon starting the integrated service.

Foremost, the master device 1101 receives a start command from the user, and activates the starter. Here, as the start command from the user, for example, a command of displaying an icon 9001a of "device integrated portal" on a display device (not shown) of the master device 1101 as shown in FIG. 9, and the user touching the icon 9001a is adopted.

For example, when the master device 1101 is to be realized as an application of Android (registered trademark), the starter corresponds to Activity Class. Subsequently, the starter requests the integrated service determination unit 1132 to start the service select UI (S5001).

Subsequently, the integrated service determination unit 1132 acquires the URI of the service select UI managed by the integrated service information management unit 1131 (S5002), and designates the URI and issues a start command of the service select UI to the UI application execution engine 1106 (S5003). Consequently, the UI application execution engine 1106 reads the script data of the service select UI from the designated URI, and starts the service select UI as the application 1107.

Subsequently, the service select UI uses the API provided by the integrated service information management unit 1131 to the application 1107 and requests the integrated service information management unit 1131 to acquire the integrated service information (S5004), and thereby acquires the integrated service information.

Subsequently, the service select UI uses the API provided by the device connection management unit 1102, and acquires the device information of the peripheral device via the device connection management unit 1102 (S5005). Subsequently, the service select UI cross checks the acquired device information and the integrated service information, extracts the executable integrated services, presents the extracted integrated services to the user, and determines the integrated service to be executed based on instructions from the user (S5005A).

In the foregoing case, the service select UI displays a list of the extracted integrated services on a display of the master device 1101 as shown in FIG. 10A and FIG. 10B, and determines the integrated service by causing the user to touch one of the integrated services.

In the example of FIG. 10A, icons 1011a, 1011b showing the integrated services of "video playback" and "photo exchange" are displayed as a list on the display of the master device 1101. Moreover, in the example of FIG. 10B, icons 1013a to 1013c showing the integrated services of "video playback", "photo exchange" and "travel plan" are displayed as a list. The user selects the integrated service by touching the icon of the desired integrated service among the foregoing icons.

Subsequently, the service select UI notifies the service ID of the integrated service to be executed to the integrated service determination unit 1132 (S5006).

Subsequently, the integrated service determination unit 1132 refers to the UI application list 4002 of the integrated service to be executed among the integrated service information managed by the integrated service information management unit 1131, and acquires the URI in which the UI type is "Master_UI" (S5007). In the example of FIG. 4, when the integrated service to be executed is "photo exchange", "S001/V03/APP01master_index.html" stored in the file path is acquired as the URI.

Here, when the device information of the master device 1101 does not satisfy the specification requirement of the integrated service to be executed, the integrated service determination unit 1132 displays information, on a display device (not shown), to the effect that the selected integrated service cannot be executed, and thereby notifies the user that the selected integrated service cannot be executed. Subsequently, the integrated service determination unit 1132 may stop the execution of the integrated service.

Subsequently, the integrated service determination unit 1132 designates the acquired URI and issues a start command of the master UI to the UI application execution engine 1106 (S5008). Consequently, the UI application execution engine 1106 reads the script data of the master UI from the designated URI, and starts the master UI as the application 1107.

Subsequently, the master UI uses the API provided by the integrated service information management unit 1131 to the application 1107, and acquires the UI application list 4002 of the integrated service to be executed from the integrated service information management unit 1131 (S5009).

Subsequently, the master UI uses the API provided by the device connection management unit 1102, and acquires the device information of the peripheral device via the device connection management unit 1102 (S5010, S5011).

Subsequently, the master UI cross checks the device information and the UI application list 4002, and determines the client device 1201 for which a connection request is to be sent (S5011A). For example, assuming that the UI application list 4002 shown in FIG. 4 is acquired, a peripheral device that satisfies the specification requirement of the line 4022 or the line 4023 is determined as the client device 1201.

Here, the master UI makes an inquiry to the user by displaying, on a display device (not shown), a list of the peripheral devices that satisfy the specification requirement. In addition, the master UI may also determine, as the client device 1201, the peripheral device that was designated by the user through operation of an operating device (not shown) as the peripheral device with a network connection is to be established.

Subsequently, the master UI uses the API provided by the device connection management unit 1102 to the application 1107, and sends a connection request to the device connection management unit 1102 for establishing a connection with the client device 1201 (S5012).

The device connection management unit 1102 that received the connection request from the master UI sends a connection request to the client-side device connection management unit 1202 (S5013). The client-side device connection management unit 1202 displays, on a display device (not shown), information showing that a connection request was sent from the master device 1101, and thereby notifies the user that a connection request was made. Subsequently, the client-side device connection management unit 1202 receives instructions from the user on whether to approve the connection request, and returns the command result to the connection management unit 1122 (S5013A).

In the foregoing case, the client-side device connection management unit 1202 displays, on a display device (not shown) of the client device 1201, for example, the user name or the like of the master device 1101 that made the connection request to notify the user that a connection request was made, displays an agree button and a reject button on a display device (not shown), and causes the user to touch the agree button or the reject button and input the user's approval/disapproval of the connection request.

When the device connection management unit 1102 that received the reply receives a command result that approves the connection request, the device connection management unit 1102 delivers, to the master UI, the device information and the IP address of the client device 1201 that sent the command result (S5013B).

Subsequently, the master UI designates the service ID of the integrated service to be executed and the IP address list of the client devices 1201 with a network connection was established, and sends a client UI determination request to the integrated service determination unit 1132 (S5014).

Subsequently, the integrated service determination unit 1132 acquires the UI application list 4002 of the integrated service to be executed from the integrated service information management unit 1131 (S5015).

Subsequently, the distribution script determination unit 1133 cross checks the device information of each client device 1201 and the specification requirement of the integrated service information, and determines the client UI to be distributed to the respective client devices 1201 (S5016).

Subsequently, when there are a plurality of client UI candidates in a certain client device 1201 and it is not possible to uniquely determine the client UI, the distribution script determination unit 1133 designates the client UI candidates and requests the master UI to determine the client UI (S5017). The master UI that received the foregoing request determines the client UI that is suitable for this client device 1201 among the client UI candidates of the client device 1201, and notifies the determination result to the distribution script determination unit 1133.

In this sequence diagram, while the distribution script determination unit 1133 determined the client UI, without limitation thereto, the master UI may also cross check the UI application list 4002 and the device information of each client device 1201, and thereby determine the client UI of the respective client devices 1201.

Subsequently, the distribution script determination unit 1133 ultimately determines the client UI of the respective client devices 1201 (S5018), and sends a determination notice to the master UI (S5019). Note that, in S5016, when the distribution script determination unit 1133 was able to uniquely determine the client UI of each client device 1201, the distribution script determination unit 1133 may send the determination notice to the master UI in S5017.

Here, with the sequence diagram shown in FIG. 5, the order was as follows; namely, the service select UI determined the integrated service, and, after the master UI was started, the master UI established the network connection and sent the client UI determination request, but the present invention is not limited thereto. In other words, the order may also be as follows; namely, the service select UI establishes the network connection and determines the integrated service, and thereafter starts the master UI. Subsequently, the master UI sends, to the distribution script determination unit 1133, the client UI determination request which designates the IP address list of the client device 1201.

Figure 6:
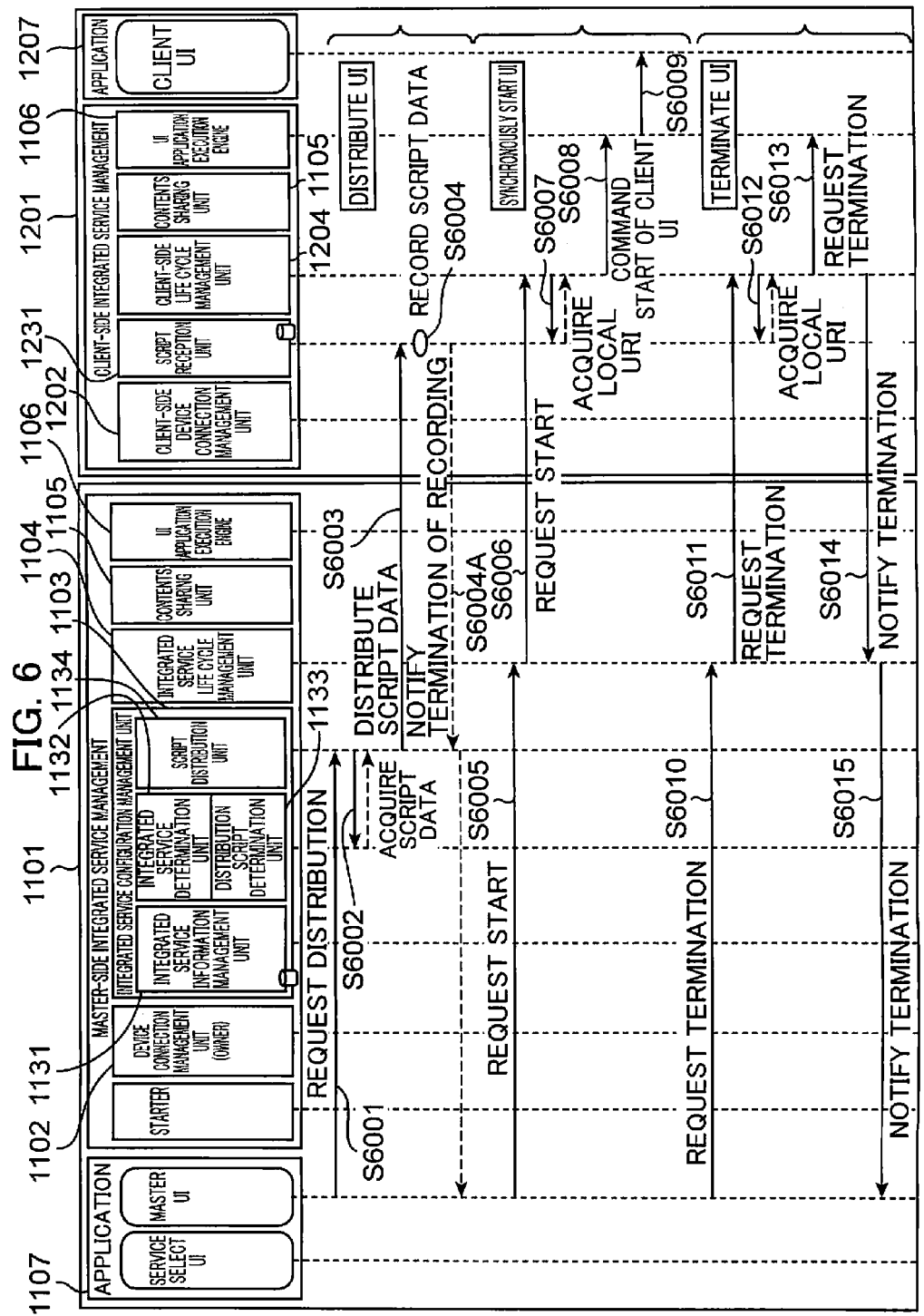
FIG. 6 is a sequence diagram which follows FIG. 5 and is a sequence diagram in the case of adopting distribution method 1.

FIG. 6 is a sequence diagram which follows FIG. 5 and is a sequence diagram in the case of adopting distribution method 1 described above. Foremost, the master UI uses the API provided by the script distribution unit 1134, designates the IP address list of the client device 1201, the service ID of the integrated service to be executed, and the ID of the client UI, and thereby sends the distribution request to the script distribution unit 1134 (S6001).

Subsequently, the script distribution unit 1134 acquires, from the integrated service determination unit 1132, the script data of the client UI to be distributed to the respective client devices 1201 (S6002).

Subsequently, the script distribution unit 1134 distributes, to the script reception unit 1231 of each client device 1201, information such as the script data of the client UI, the ID of the client UI, and the service ID of the integrated service to be executed (S6003).

Subsequently, the script reception unit 1231 records the received information such as the script data of the client UI, the service ID, and the ID of the client UI (S6004). Here, in S6004, the script reception unit 1231 may cache the script data of the client UI in a cache region of the client device 1201, or install the script data of the client UI in a persistent region of the client device 1201.

Subsequently, the script reception unit 1231 sends a recording termination notice of the script data to the master UI via the script distribution unit 1134 (S6004A).

Subsequently, the master UI uses the API provided by the integrated service life cycle management unit 1104, and sends a start request of the integrated service to be executed to the integrated service life cycle management unit 1104 (S6005). This start request contains the IP address of the respective client devices 1201.

Subsequently, the integrated service life cycle management unit 1104 that received the start request from the master UI notifies, to the client-side life cycle management unit 1204, the service ID of the integrated service to be executed, the ID of the client UI, and the IP address list of the respective client devices 1201, and sends a start request of the client UI (S6006).

Subsequently, the client-side life cycle management unit 1204 designates the service ID and the ID of the client UI, and acquires, from the script reception unit 1231, the local URI which is the location of the client UI where the script data is recorded (S6007).

Subsequently, the client-side life cycle management unit 1204 designates the local URI and sends a start request of the client UI to the UI application execution engine 1106 (S6008). Subsequently, the UI application execution engine 1106 reads the script data of the client UI from the local URI, and starts the client UI (S6009). Consequently, the UI application is synchronously started by the master device 1101 and the client device 1201.

S6010 to S6015 show the processing when the master device 1101 is to terminate the integrated service. Foremost, the master UI designates the IP address of the client device 1201, and sends a termination request to the integrated service life cycle management unit 1104 (S6010).

Subsequently, the integrated service life cycle management unit 1104 sends, to the client-side life cycle management unit 1204, a termination request designating the service ID of the integrated service to the terminated and the ID of the client UI (S6011).

Subsequently, the client-side life cycle management unit 1204 acquires the local URI of the running client UI from the script reception unit 1231 (S6012). Subsequently, the client-side life cycle management unit 1204 sends a termination request of the running client UI to the UI application execution engine 1106 (S6013). Consequently, the UI application execution engine 1106 terminates the running client UI. Subsequently, the client-side life cycle management unit 1204 sends, to the integrated service life cycle management unit 1104, a termination notice designating the IP address of the (own) client device 1201. Subsequently, the integrated service life cycle management unit 1104 that received the termination notice sends, to the master UI, a termination notice designating the IP address of the client device 1201 (S6015).

Figure 7:
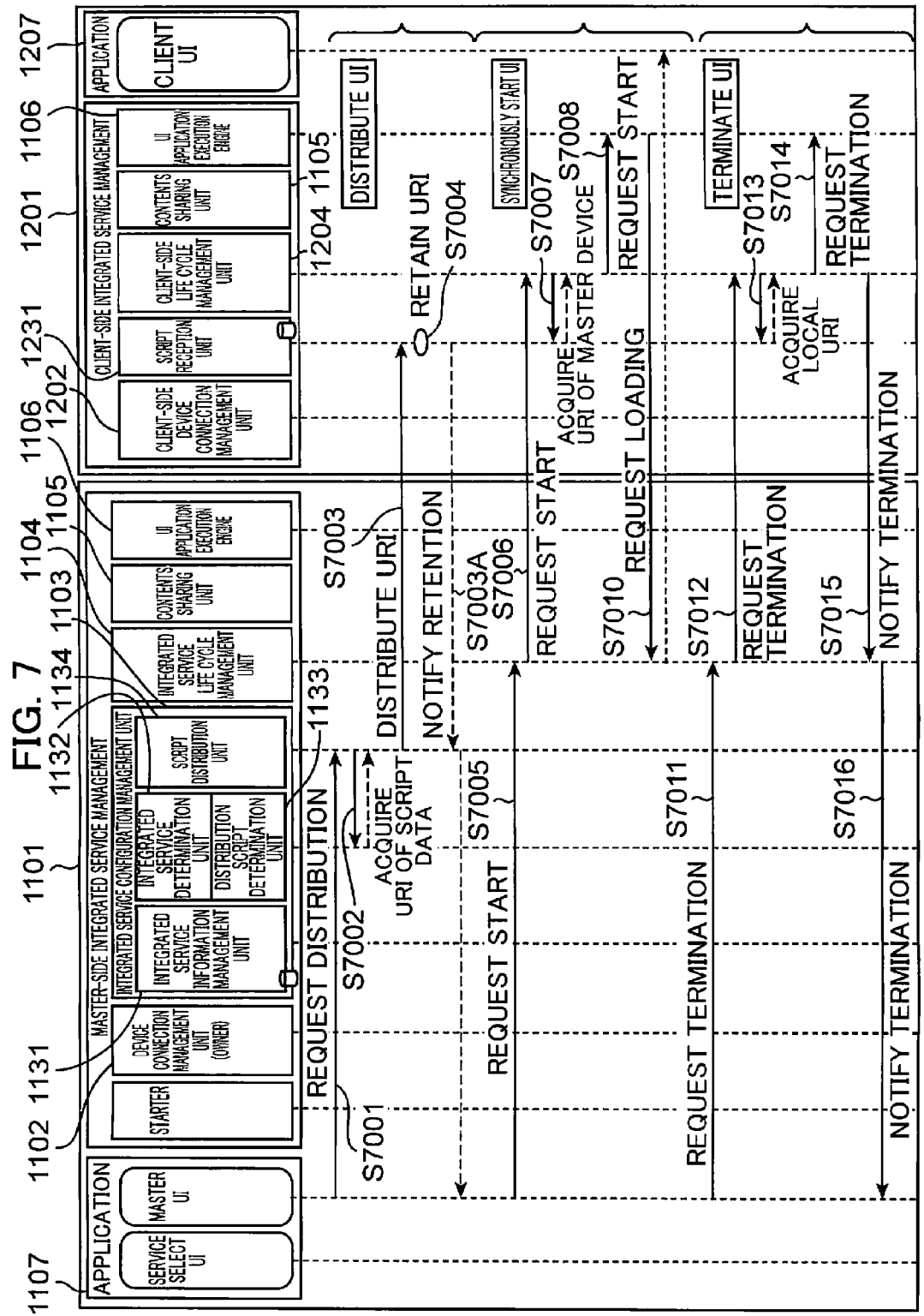
FIG. 7 is a sequence diagram which follows FIG. 5, and is a sequence diagram in the case of adopting distribution method 2.

FIG. 7 is a sequence diagram which follows FIG. 5, and is a sequence diagram in the case of adopting distribution method 2 described above. Foremost, the master UI uses the API provided by the script distribution unit 1134, and sends, to the script distribution unit 1134, a distribution request designating the IP address list of the client device 1201, the service ID of the integrated service to be executed, and the ID of the client UI (S7001).

Subsequently, the script distribution unit 1134 acquires, from the integrated service determination unit 1132, the URI of the client UI to be distributed to the respective client devices 1201 (S7002). This URI is the URI of the script data of the client UI retained by the master device 1101.

Subsequently, the script distribution unit 1134 distributes, to the script reception unit 1231 of the client device 1201, the acquired information such as the URI of the client UI, the ID of the client UI, and the service ID of the integrated service to be executed (S7003). Here, the difference in comparison to FIG. 6 is that the URI is sent to the client device 1201 rather than the script data of the client UI.

Subsequently, the script reception unit 1231 retains the received information such as the URI, the service ID, and the ID of the client UI (S7004).

Subsequently, the script reception unit 1231 sends to the master UI, via the script distribution unit 1134, a retention notice for notifying that information such as the URI, the service ID, and the ID of the client UI has been retained (S7003A).

Subsequently, the master UI uses the API provided by the integrated service life cycle management unit 1104 and sends, to the integrated service life cycle management unit 1104, a start request of the integrated service to be executed (S7005). This start request contains the IP address list of the respective client devices 1201.

Subsequently, the integrated service life cycle management unit 1104 that received the start request from the master UI sends, to the client-side life cycle management unit 1204, a start request of the client UI by notifying the service ID, the ID of the client UI, and the IP address list of the respective client devices 1201 (S7006).

Subsequently, the client-side life cycle management unit 1204 designates the service ID and the ID of the client UI, and acquires, from the script reception unit 1231, the URI of the client UI of the master device 1101 (S7007).

Subsequently, the client-side life cycle management unit 1204 designates the URI of the client UI, and sends a start request of the client UI to the UI application execution engine 1106 (S7008). Subsequently, the UI application execution engine 1106 designates the URI of the client UI, and sends a load request of the client UI to the script distribution unit 1134 (S7010). Consequently, the script data of the client UI stored in the master device 1101 is loaded in the client device 1201 via the network. Subsequently, the UI application execution engine 1106 decodes the loaded script data of the client UI, and executes the client UI. Consequently, the UI application is synchronously started by the master device 1101 and the client device 1201.

S7011 to S7016 show the processing when the master device 1101 is to terminate the integrated service, and the explanation thereof is omitted since they are the same as S6011 to S6016 of FIG. 6.

Figure 8:
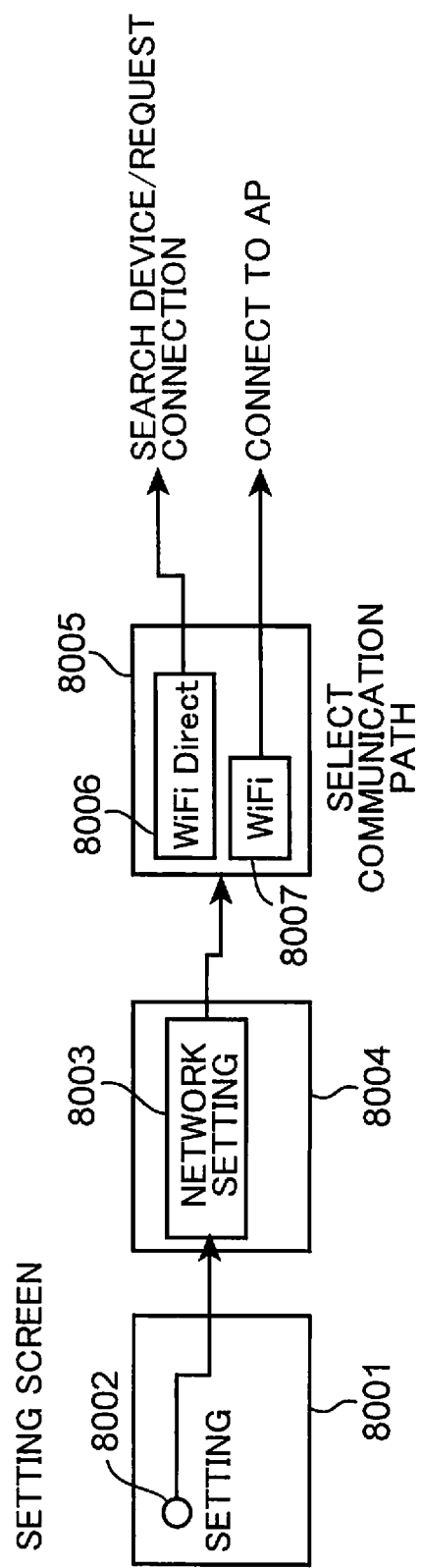
FIG. 8 is a diagram showing an example of the screen transition that is displayed on the display of the master device when the user selects the network.

FIG. 8 is a diagram showing an example of the screen transition that is displayed on the display of the master device 1101 when the user selects the network. Foremost, a screen 8001, on which is displayed an icon 8002 for setting various items, is displayed on the display device. When the icon 8002 is touched by the user, a screen 8004 is displayed on the display device.

An icon 8003, on which is displayed the network setting, is displayed on the screen 8004. When the icon 8003 is touched by the user, a screen 8005 for selecting the transmission path is displayed on a display (display device). Displayed on the screen 8005 are an icon 8006 which indicates WiFi Direct, and an icon 8007 which indicates WiFi. When the icon 8006 is touched by the user, the master device 1101 selects an ad hoc network as the communication path. Meanwhile, when the icon 8007 is touched by the user, the master device 1101 selects a network via an access point as the communication path.

When the master device 1101 selects an ad hoc network as the communication path, the master device 1101 searches for a peripheral device and sends a connection request (invitation) for establishing a network connection to the peripheral device. Meanwhile, when the master device 1101 selects a network via an access point as the communication path, the master device 1101 establishes a network connection with the access point, and communicates with the other devices via the access point.

FIG. 9 is a diagram showing an example of the screen transition that is displayed on the display of the master device 1101 upon starting the integrated service. Foremost, when a start command of the integrated service is input by the user, a screen 9001 is displayed. Displayed on the screen 9001 is an icon 9001a indicating the device integrated portal. When the icon 9001a is touched, a screen 9002 is displayed on a display.

The screen 9002 is a screen for setting the transmission path as with the screen 8005 of FIG. 8. On the screen 9002, when an icon 9002a indicating WiFi Direct is touched by the user, if currently connected to the WiFi network, a screen 9003 for confirming whether the transmission path may be switched to WiFi Direct is displayed on a display.

Meanwhile, if currently not connected to the WiFi network, a screen 9007 for searching for the peripheral device once again is displayed on a display.

On the screen 9003, when an icon 9003a indicating OK is touched by the user, the peripheral device is searched, and a screen 9004 showing a list of the searched peripheral devices is displayed on a display. In the example of the screen 9004, the three devices of A to C were searched as the peripheral device, and displayed on a display.

Meanwhile, on the screen 9003, when an icon 9003b indicating cancel is touched by the user, the screen 9002 is displayed on a display once again.

On the screen 9004, the device with which a network connection is to be established among the peripheral devices; that is, the client device 1201 is selected by the user, and an icon 9004a indicating "connect selected device" is touched. In the example of the screen 9004, the devices A to C are selected by the user as the client device 1201.

Consequently, a connection request is sent to the selected client device 1201. Here, a screen 9005 showing that a connection request was sent to the client device 1201 is displayed on a display.

Subsequently, a screen 9006 showing a list of client devices 1201 with which a network connection was established is displayed on a display. In the example of the screen 9006, since a reply approving the connection request was received from the three client devices 1201 A to C, a list of the three client devices 1201 A to C is displayed.

On the screen 9006, when an icon 9006a indicating OK is touched by the user, the integrated service is executed between the master device 1101 and the three client devices 1201 A to C.

The screen 9007 shows that, currently, a network connection has already been established with the two devices A and B. When an icon 9007a indicating search again is touched by the user, the master device 1101 searches for the peripheral device once again, and a screen 9008 showing the search result is displayed on a display.

The screen 9008 shows that the peripheral device C was newly searched. On the screen 9008, when C is selected as the client device by the user and an icon 9008a indicating "connect selected device" is touched, a screen 9009 showing that a connection request is being sent to the device C is displayed on a display.

Subsequently, when an approval of the connection request is received from the client device 1201 C, a screen 9010 showing that the network connection with the client device 1201 C was established, in addition to the client devices 1201 A and B with which the network connection has been previously established, is displayed on a display.

On the screen 9010, when an icon 9010a indicating OK is touched by the user, the integrated service is executed between the master device 1101 and the three client devices 1201 A to C.

On the screen 9002, when an icon 9002b indicating WiFi is touched by the user, a screen 9011 showing the devices with which a network connection has been established via WiFi is displayed on a display. On the screen 9011, when an icon 9011a indicating OK is touched, communication between the devices A and B and the master device 1101 via the access point is performed.

FIG. 10A and FIG. 10B are diagrams showing an example of the screen transition that is displayed on the display of the master device when the user selects the integrated service. FIG. 10A shows a case where there are two devices A and B as the client devices 1201, and FIG. 10B shows a case where there are three devices A to C as the client devices 1201.

On the screen 1010 of FIG. 10A, a list of the two devices A and B as the client device 1201 is displayed. On the screen 1010, when an icon 1010a indicating OK is touched by the user, a screen 1011 is displayed on a display.

Displayed on the screen 1011 are a list of integrated services that can be executed by the client devices 1201 A and B, and the client device 1201 to be used upon executing the respective integrated services. In the example of the screen 1011, displayed are an icon 1011a indicating video playback and an icon 1011b indicating photo exchange. Moreover, an icon indicating A is displayed next to the icon 1011a, and this shows that the client device 1201 A is used upon executing the integrated service of video playback. Moreover, an icon indicating B is displayed next to the icon 1011b indicating photo exchange, and this shows that the client device 1201 B is used upon executing the integrated service of photo exchange.

In the example of the screen 1011, the icon 1011b is touched by the user and the integrated service of photo exchange is selected by the user. Accordingly, the master device 1101 determines the client UI required by the client device 1201 B upon executing the integrated service of photo exchange, and distributes the determined client UI to the client device 1201 B.

Meanwhile, when video playback is selected by the user on the screen 1011, the master device 1101 determines the client UI required by the client device 1201 A upon executing the integrated service of video playback, and distributes the determined client UI to the client device 1201 A.

On the screen 1012 shown in FIG. 10B, since a network connection is established with the three client devices 1201 A to C, the master device 1101 displays a list of the three client devices 1201 A to C.

In FIG. 10B, when an icon 1012a indicating OK is touched by the user, a screen 1013 is displayed. In the example of the screen 1013, a list of the three integrated services of video playback, photo exchange and travel plan that can be executed by the client devices 1201 A to C is displayed.

In addition, in the example of the screen 1013, an icon 1013c indicating travel plan is touched by the user. Accordingly, the master device 1101 determines the client UI required by the two client devices 1201 A and C upon executing the integrated service of travel plan, and distributes the determined client UI to each of the two client devices 1201 A and C.

As explained above, according to the integrated service management system 1001 of Embodiment 1, an ad hoc network is build with a peripheral client device 1201 under an environment without an access point, and a client UI that satisfies the specification requirement of the client device 1201 with which a network connection was established is distributed to the client device 1201. Thus, it is possible to realize an integrated service using an ad hoc network even under an environment without an access point.

(Embodiment 2)

While the integrated service information was managed in the integrated service configuration management unit 1103 in Embodiment 1, in this embodiment, the integrated service information is managed in an application 11107, and the client UI is determined by using this integrated service information.

Figure 11:
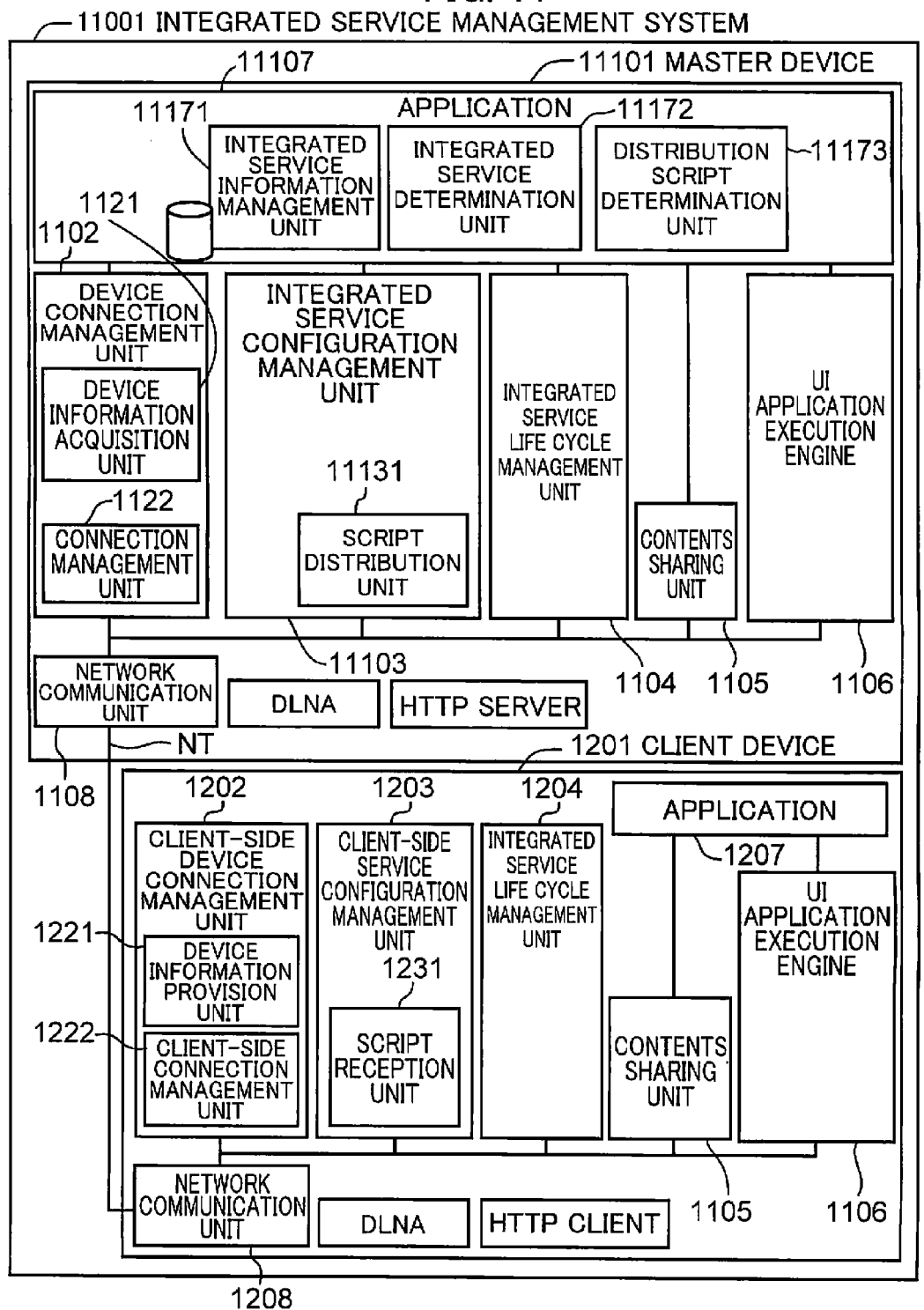
FIG. 11 is a functional block diagram showing an example of the integrated service management system in Embodiment 2 of the present invention.

FIG. 11 is a functional block diagram showing an example of the integrated service management system 11001 in Embodiment 2 of the present invention.

In FIG. 11, the same reference numeral is given to the same constituent elements as FIG. 1, and the explanation thereof is omitted. The integrated service management system 11001 in Embodiment 2 comprises a master device 11101 and a client device 1201. The master device 11101 of Embodiment 2 is now explained.

(Explanation of Master Device 11101)

The master device 11101 comprises a device connection management unit 1102, an integrated service configuration management unit 11103, an integrated service life cycle management unit 1104, a contents sharing unit 1105, a UI application execution engine 1106, an application 11107, and a network communication unit 1108.

The integrated service configuration management unit 11103 comprises a script distribution unit 11131. The script distribution unit 11131 distributes, to the respective client devices 1201, the client UI that was determined by the distribution script determination unit 11173 of the application 11107.

Moreover, the script distribution unit 11131 provides an interface (IF) to the application 11107 for distributing the client UI, and distributes the client UI to the respective client devices 1201 upon designating the IP address list of the client devices 1201 from the application 11107 and the client UI to be distributed to the respective client devices 1201.

Note that the script distribution unit 11131 may distribute the client UI to the client device 1201 by using the distribution method 1 or the distribution method 2 explained in Embodiment 1.

The application 11107 comprises an integrated service information management unit 11171, an integrated service determination unit 11172, and a distribution script determination unit 11173. In Embodiment 1, the integrated service information management unit 1131, the integrated service determination unit 1132, and the distribution script determination unit 1133 were provided in the integrated service configuration management unit 1103. In Embodiment 2, the application 11107 comprises the integrated service information management unit 11171, the integrated service determination unit 11172, and the distribution script determination unit 11173.

The integrated service information management unit 11171 manages the integrated service information. The difference in comparison to the integrated service information management unit 1131 of Embodiment 1 is that the integrated service information management unit 11171 independently manages the integrated service information.

For example, the integrated service information management unit 11171 manages description data which realizes the UI for displaying a list of the integrated services on a display and causing the user to determine the integrated service, and causes the user to use this UI and determine the integrated service. For example, the integrated service information management unit 11171 adopts an independently managed specification requirement as the specification requirement of the UI application list 4002 shown in FIG. 4.

Moreover, the integrated service information management unit 11171 may also cause the user to input one's hobbies and the like in advance, and delete the integrated services that do not match the user's preference from the integrated service list 4001 shown in FIG. 4. Moreover, the integrated service information management unit 11171 may also cause the user to input one's age, gender and other information in advance, and delete the integrated services that do not match the user's age, gender and the like from the integrated service list 4001 shown in FIG. 4.

Moreover, the integrated service information management unit 11171 may also cause the user to input one's preferred manufacturer or model, and delete the UI applications other than those of the user's preferred manufacturer or model from the UI application list 4002 shown in FIG. 4. Consequently, the user can perform the integrated service by using the client device 1201 of one's preferred manufacturer or model.

As a result of entrusting the management of the integrated service information to the application 11107, the integrated service information shown in FIG. 4 can be customized into the integrated service information that is suitable for the usage or purpose of the application 11107, and the client UI may be determined by using this integrated service information.

Note that the integrated service information management unit 11171, the integrated service determination unit 11172, and the distribution script determination unit 11173 are realized by the master UI or the initial (Initial UI) that was started by the application 11107.

The various terms used in Embodiment 2 of the present invention are now explained. The terms integrated service, UI application, and client UI are the same as Embodiment 1. While the master UI has the same functions as in Embodiment 1, it differs from Embodiment 1 in that the master UI is started by the initial UI in this embodiment.

The initial UI is initially started by the master device 11101. Subsequently, the initial UI determines one integrated service among a plurality of integrated services based on instructions from the user, and starts the master UI configuring the determined integrated service.

Figure 12:
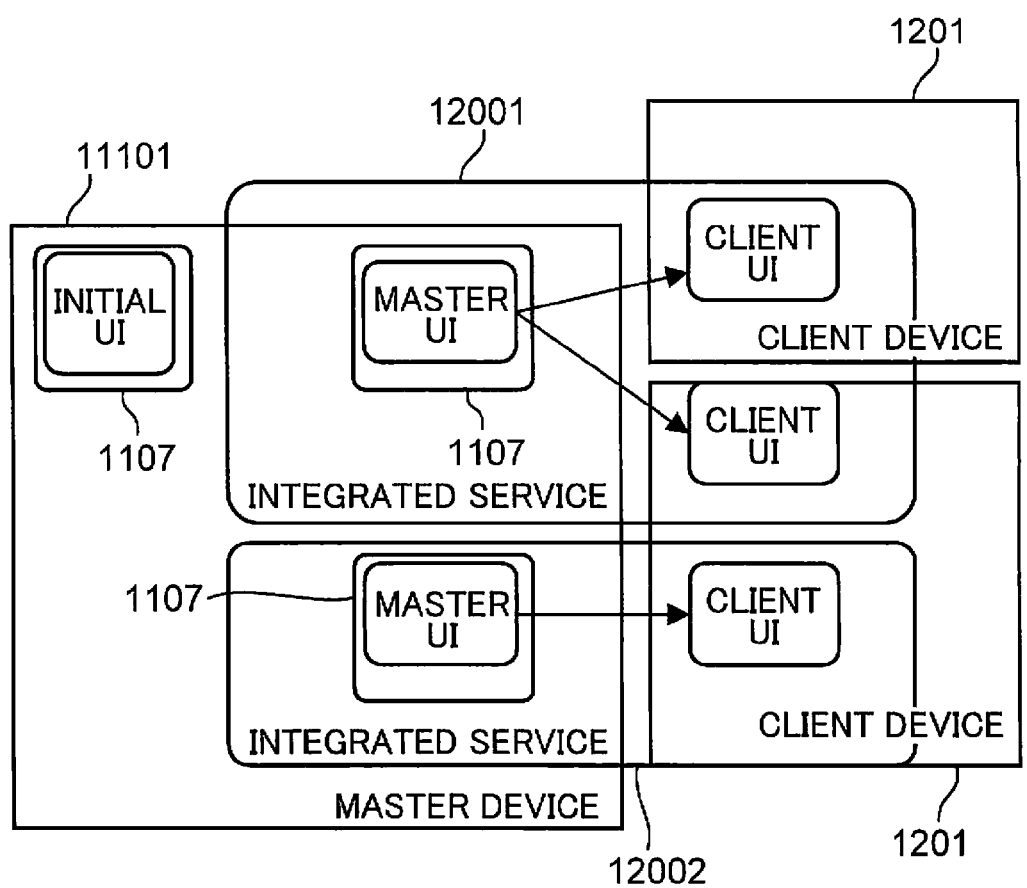
FIG. 12 is a schematic diagram showing an example of the integrated service configuration in Embodiment 2 of the present invention.

FIG. 12 is a schematic diagram showing an example of the integrated service configuration in Embodiment 2 of the present invention. The master device 11101 manages one initial UI, and initially starts the initial UI. The initial UI selects the integrated service, and starts the master UI configuring the integrated service. In FIG. 12, the master device 11101 comprises two integrated services 12001, 12002. The integrated service 12001 is an integrated service that is performed by the master device 11101 and two client devices 1201. The integrated service 12002 is an integrated service that is performed by the master device 11101 and one client device 1201.

For example, assuming that the initial UI selected the integrated service 12001, the master UI of the integrated service 12001 is started. Meanwhile, assuming that the master UI selected the integrated service 12002, the master UI of the integrated service 12002 is started.

Returning to FIG. 11, in the same manner as the integrated service determination unit 1132, the integrated service determination unit 11172 determines the integrated service to be executed according to the integrated service information that is managed by the integrated service information management unit 11171.

In the same manner as the distribution script determination unit 1133, the distribution script determination unit 11173 determines the client UI to be distributed to the respective client devices 1201 according to the integrated service information that is managed by the integrated service information management unit 11171.

Note that, as with Embodiment 1, the respective blocks other than the application 11107 of the master device 11101 shown in FIG. 11 may also be configured from a master device program, a dedicated hardware circuit, or an integrated circuit. Moreover, also as with Embodiment 1, the client device 1201 may also be configured from a client device program, a dedicated hardware circuit, or an integrated circuit.

(Explanation of Processing)

An example of the processing flow of the integrated service management system 11001 in Embodiment 2 of the present invention is now explained. Here, the processing of determining the integrated service, establishing the network connection, determining the client UI, distributing the client UI, and executing the integrated service is explained.

Figure 13:
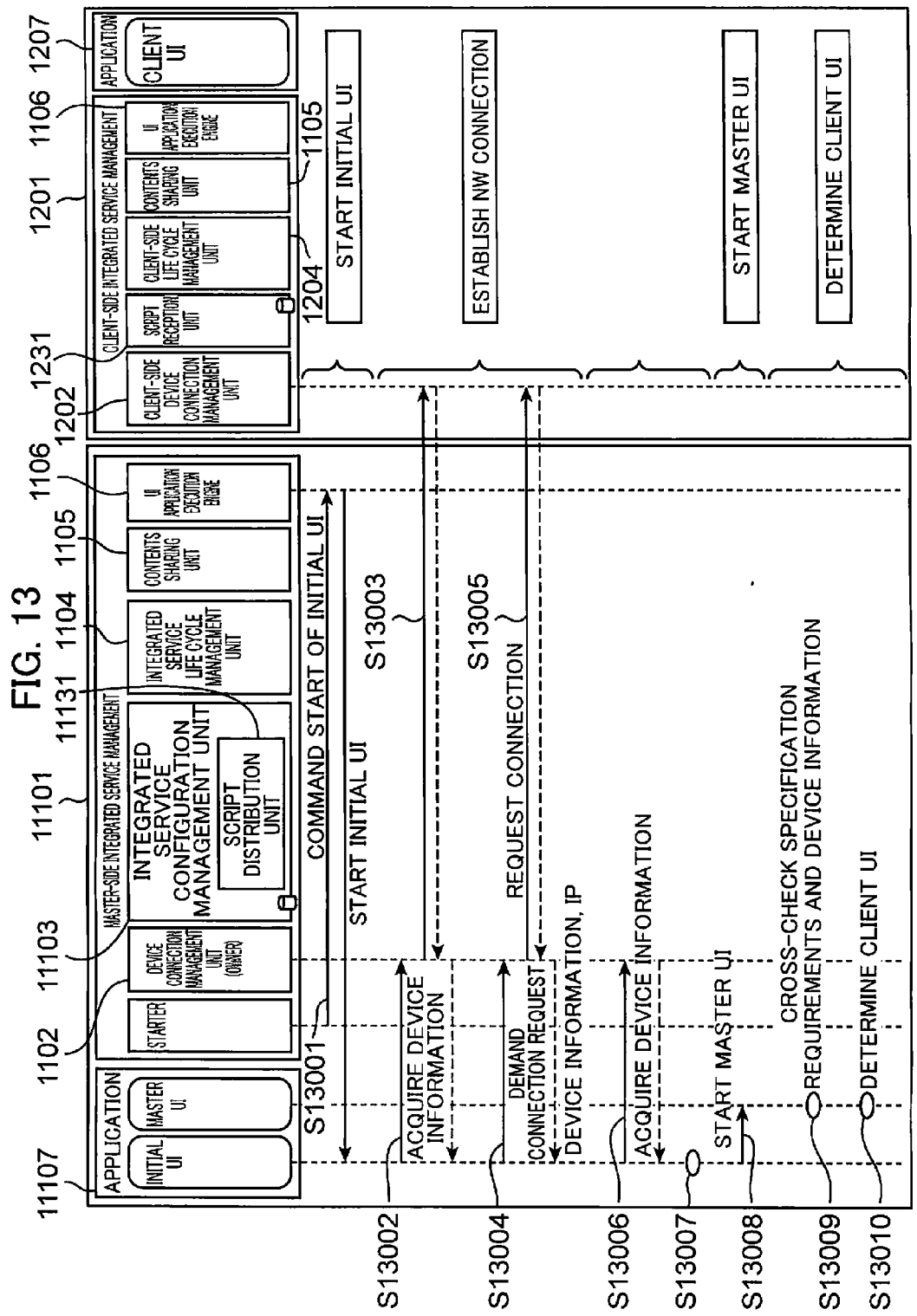
FIG. 13 is a sequence diagram showing an example of the processing from determining the integrated service, establishing the network connection, and determining the client UI.

FIG. 13 is a sequence diagram showing an example of the processing from determining the integrated service, establishing the network connection, and determining the client UI.

Foremost, the master device 11101 activates the starter (Starter) upon receiving a start command from the user, and thereafter starts the processing. Here, as the start command from the user, for example, a command of displaying an icon 9001*a* of "device integrated portal" on a display device of the master device 11101 as shown in FIG. 9, and the user touching the icon 9001*a* is adopted.

Subsequently, the starter designates the URI and issues a start command of the initial UI to the UI application execution engine 1106. Consequently, the initial UI is started as the application 11107 (S13001).

The started initial UI uses the API provided by the device connection management unit 1102, and acquires the device information of the peripheral device (S13002, S13003).

Subsequently, the integrated service information management unit 11171 of the initial UI refers to the independently managed integrated service information and the acquired device information, determines the client device 1201 to which a connection request is to be sent, and uses the API provided by the device connection management unit 1102 to the application 11107 in order to send a connection request to the client device 1201 (S13004).

The device connection management unit 1102 that received the connection request from the initial UI sends a connection request to the client-side device connection management unit 1202 of the client device 1201 (S13005). The client-side device connection management unit 1202 determines whether to establish the connection, and replies to the device connection management unit 1102 of the master device 11101. Here, the client-side device connection management unit 1202 determines whether to establish the connection based on instructions from the user.

Subsequently, the device connection management unit 1102 returns, to the initial UI, the IP address and device information of the client device 1201 with which a network connection was established.

Subsequently, the integrated service determination unit 11172 of the initial UI uses the API provided by the device connection management unit 1102 and acquires the device information of the client device 1201 (S13006).

Subsequently, the integrated service determination unit 11172 of the initial UI cross checks the integrated service information and device information managed by the integrated service information management unit 11171, extracts the executable integrated services, presents the extracted integrated services to the user, and determines the integrated service to be executed based on instructions from the user (S13007).

Figure 10:
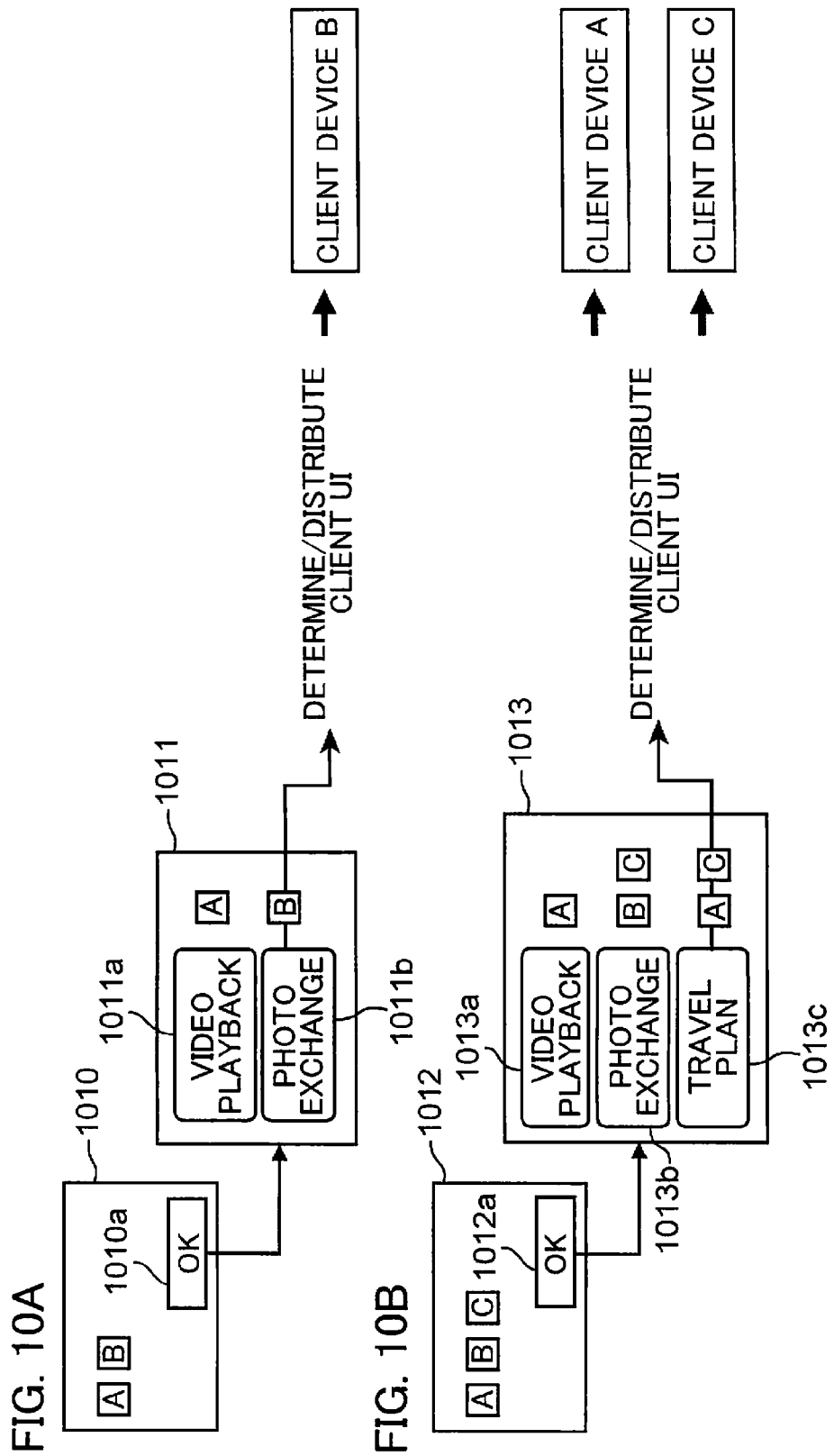

In the foregoing case, the integrated service determination unit 11172 of the initial UI may display a list of the extracted integrated services on a display of the master device 1101 as shown in FIG. 10, and determine the integrated service by causing the user to touch one of the integrated services.

Subsequently, the integrated service determination unit 11172 of the initial UI refers to the UI application list 4002 configuring the integrated service information, and starts the master UI corresponding to the integrated service to be executed (S13008).

Subsequently, the distribution script determination unit 11173 of the master UI cross checks the device information of the respective client devices 1201 and the specific requirement of the integrated service information managed by the integrated service information management unit 11171 (S13009), and determines the client UI to be distributed to the respective client devices 1201 (S13010).

Here, in the sequence shown in FIG. 13, the order was as follows; namely, the initial UI establishes the network connection and determines the integrated service, and, after the master UI is started, the master UI designates the IP address of the client device 1201, and determines the client UI, but the present invention is not limited thereto.

In other words, the order may also be as follows; namely, the initial UI determines the integrated service, and, after the master UI is started, the master UI establishes the network connection and determines the client UI.

Figure 14:
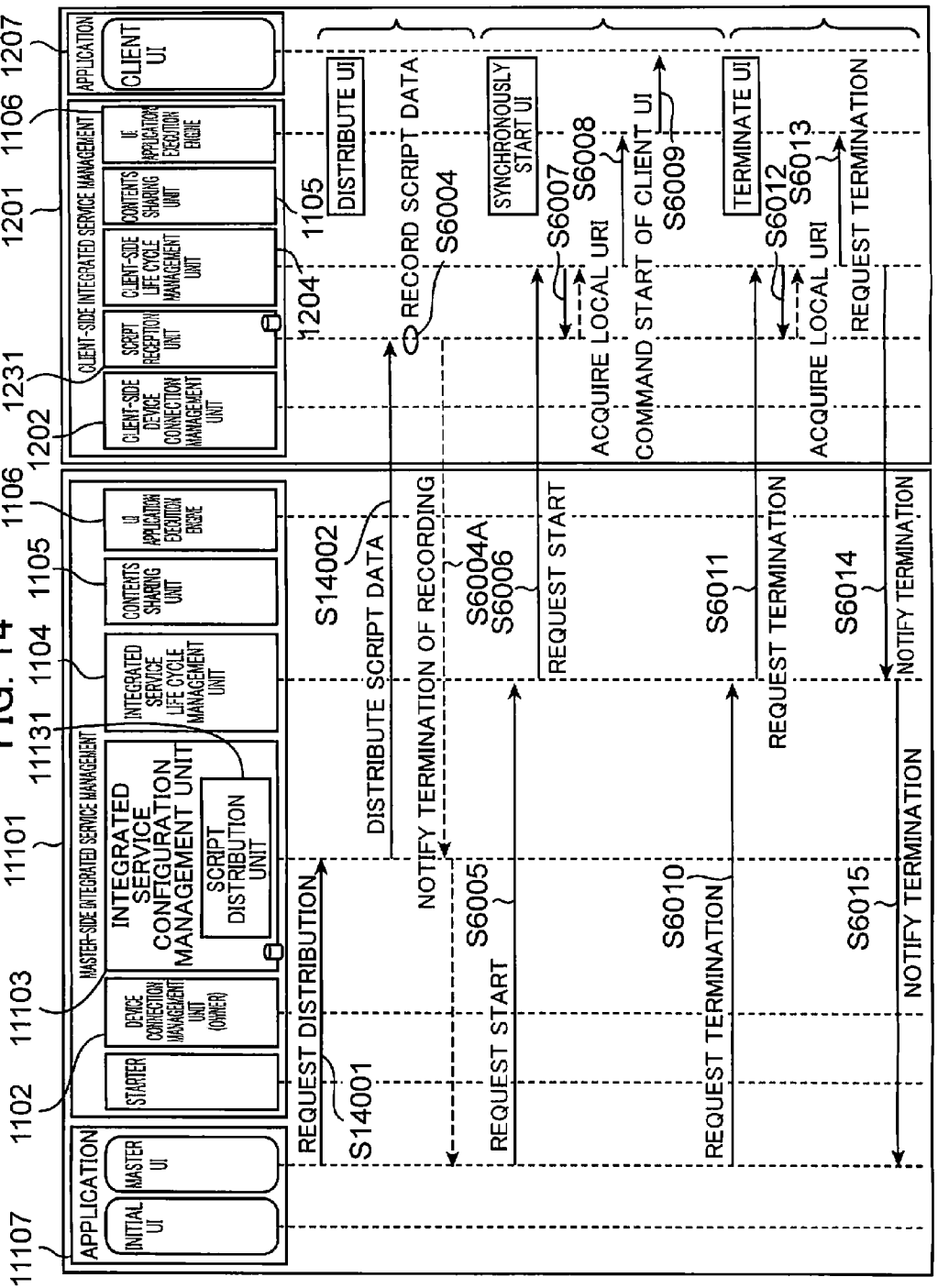
FIG. 14 is a sequence diagram which follows FIG. 13 and is a sequence diagram in the case of adopting distribution method 1.

FIG. 14 is a sequence diagram which follows FIG. 13 and is a sequence diagram in the case of adopting distribution method 1 described above. In FIG. 14, the same processing as FIG. 6 explained in Embodiment 1 is given the same reference numeral, and the explanation thereof is omitted.

Foremost, the master UI uses the API provided by the script distribution unit 11131 and designates the IP address list of the respective client devices 1201, and the script data and ID of the client UI to be distributed to the respective client devices 1201, and thereby sends a client UI distribution request (S14001).

Subsequently, the script distribution unit 11131 distributes, to the script reception unit 1231 of the respective client devices 1201, information such as the script data and ID of the client UI, and the service ID of the integrated service to be executed (S14002).

Since the subsequent processing of S6004 to S6009 is the same as the processing explained in FIG. 6 of Embodiment 1, the explanation thereof is omitted. Moreover, since S6010 to S6015 are a sequence showing an example of the processing upon terminating the integrated service as with Embodiment 1, the explanation thereof is also omitted.

Figure 15:
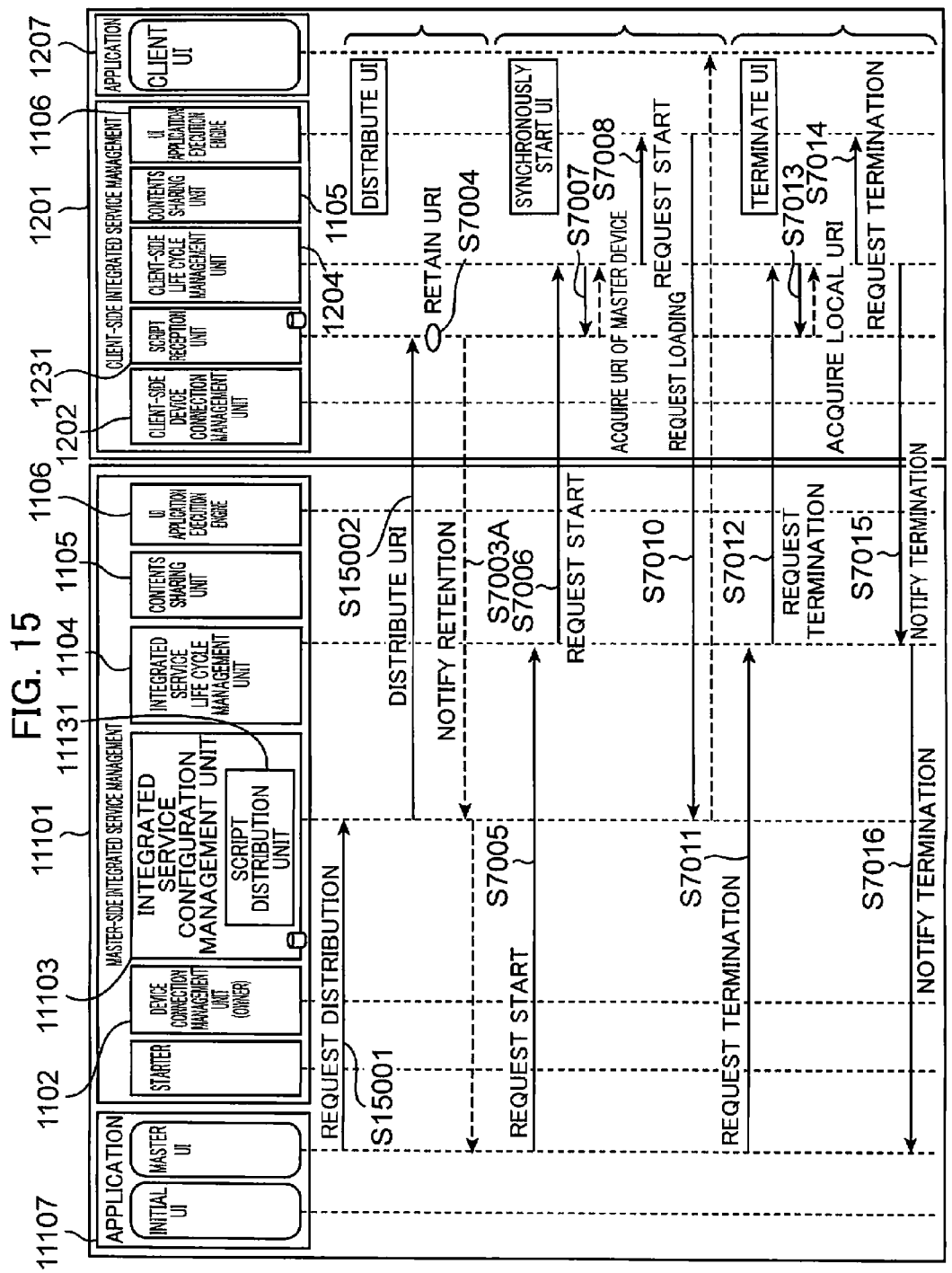
FIG. 15 is a sequence diagram which follows FIG. 13, and is a sequence diagram in the case of adopting distribution method 2.

FIG. 15 is a sequence diagram which follows FIG. 13, and is a sequence diagram in the case of adopting distribution method 2 described above. In FIG. 15, the same processing as FIG. 7 is given the same reference numeral and the explanation thereof is omitted.

Foremost, the master UI uses the API provided by the script distribution unit 11131 and designates the IP address list of the respective client devices 1201 and the URI and ID of the client UI to be distributed to the respective client devices 1201, and thereby sends a client UI distribution request (S15001).

Subsequently, the script distribution unit 11131 sends, to the script reception unit 1231 of the respective client devices 1201, information such as the URI and ID of the client UI, and the service ID (S15002).

Since the subsequent processing of S7004 to S7010 is the same as the processing explained in FIG. 7 of Embodiment 1, the explanation thereof is omitted. Moreover, since S7011 to S7016 are a sequence showing an example of the processing upon terminating the integrated service as with Embodiment 1, the explanation thereof is also omitted.

As described above, according to the integrated service management system 11001 of Embodiment 2, in addition to being able to yield the effects of Embodiment 1, since the integrated service and the client UI are determined by using the integrated service information that is independently managed by the integrated service information management unit 11171 of the application 11107, it is possible to determine the integrated service and the client UI that are suitable for the usage or purpose of the application 11107.

Note that the various embodiments described above and the various modified examples described above may also be combined as needed. Moreover, the foregoing descriptions should be considered as being exemplifications in all respects, and should not be considered as being restrictive. The scope of the present invention is not limited to the foregoing explanation and is claimed in the scope of patent claims, and is intended to cover all modifications within any meaning and scope that are equivalent to the scope of patent claims.

Summary of Embodiments (1) The master device according to one mode of the present invention is a master device which manages, on an autonomous distributed network, an integrated service that is executed by causing a plurality of devices to coordinate with each other, the master device comprising: an integrated service information management unit which manages, in relation to a plurality of integrated services, integrated service information that defines information pertaining to an application required by the devices for executing the respective integrated services and a specification requirement of the devices required for executing the application; a device information acquisition unit which acquires device information that defines a specification for a peripheral device from one or more peripheral devices detected via the autonomous distributed network; a connection management unit which determines, among the peripheral devices, one or more client devices to be used in the integrated service, and establishes a network connection with the determined client device; an integrated service determination unit which determines, among the integrated services defined by the integrated service information, an integrated service to be executed based on an instruction from a user; an application determination unit which determines an application of the client device based on the device information related to the client device and the specification requirement of the integrated service to be executed; an application distribution unit which distributes, to the client device, the application determined by the application determination unit; and an integrated service life cycle management unit which issues, to the client device, an start command of the application distributed by the application distribution unit.

According to the foregoing configuration, even in cases where one or more client devices, which do not have the application required for executing the integrated service, are connected to an autonomous distributed network, the application required for executing the integrated service is distributed to each client device. Thus, in an autonomous distributed network in which the respective devices are connected and communicate with each other without going through an access point, it is possible to realize a device integrated service by connecting one master device and one or more devices.

Moreover, since an application that coincides with the specification of each client device is distributed to the respective client devices, it is possible to avoid situations where the distributed application cannot be executed in the client device, and the integrated service can be reliably executed on the autonomous distributed network.

(2) The integrated service determination unit may extract executable integrated services based on the device information related to the one or more peripheral devices and the specification requirement defined by the integrated service information, present the extracted integrated services to the user, and determine the integrated service to be executed based on an instruction from the user, and the connection management unit may determine the one or more client devices to be used in the integrated service to be executed based on the specification requirement of the integrated service to be executed and the device information of the peripheral device.

According to the foregoing configuration, the executable integrated services are extracted based on the specification of the one or more peripheral devices, and the user can select the integrated service to be executed among the extracted integrated services. Thus, it is possible to avoid situations where the integrated service selected by the user cannot be executed. Moreover, since the specification requirement of the integrated service to be executed and the device information of the one or more peripheral devices are cross checked, and a peripheral device that can execute the integrated service to be executed is automatically determined as the client device, it is possible to spare the user from having to select a client device among the peripheral devices.

(3) The connection management unit may determine the one or more client devices from among the peripheral devices based on an instruction from the user, and the integrated service determination unit may extract executable integrated services based on the device information of the one or more client devices and the specification requirement defined by the integrated service information, present the extracted integrated services to the user, and determine the integrated service to be executed based on instructions from the user.

According to the foregoing configuration, the user of the master device selects, as the client device, a preferred peripheral device among the peripheral devices, integrated services that are executable by that client device and the master device are extracted, and the user selects the integrated service to be executed among the extracted integrated services. Thus, it is possible to prevent an integrated service from being executed with the device of a completely-unknown user, and avoid situations where the user's personal information is leaked to a user of another device.

(4) When a certain client device has a plurality of applications that satisfy the specification requirement of the integrated service to be executed, the application determination unit may present these applications to the user, and determine an application selected by the user as the application to be distributed to the client device.

According to the foregoing configuration, when there are a plurality of applications that satisfy the specification requirement, the user can select one's preferred application among such plurality of applications.

(5) The application may include a master application to be executed by the master device and a client application to be executed by the client device, and the integrated service life cycle management unit may synchronously start the master application and the client application.

According to the foregoing configuration, since the client application and the master application are started synchronously, the integrated service can be started concurrently in both the master device and the client device.

(6) The application distribution unit may distribute the application to the one or more client devices by distributing script data of the application to the client devices.

According to the foregoing configuration, the client device can record the script data of the application before the application is started, and start the application by reading the script data upon starting the application. Thus, the client device can start the application quickly.

(7) The application distribution unit may distribute a URI (Uniform Resource Identifier) of the application determined by the application determination unit to the one or more client devices.

According to the foregoing configuration, the URI (Uniform Resource Identifier) of the application is distributed to the client device from the master device, and the client device can start the application by reading the application from the URI upon starting the application. Thus, the amount of data upon distributing the application can be reduced.

(8) The application distribution unit may send an ID of the integrated service to be executed and an ID of the application upon sending the URI of the application, and the integrated service life cycle management unit may issue a start command of the application to the client device by designating the ID of the integrated service to be executed or the ID of the application upon starting the application.

According to the foregoing configuration, the ID of the integrated service to be executed and the ID of the application are also sent upon sending the URI of the application. Thus, the application distribution unit can start the application merely be designating the ID of the integrated service and the ID of the application upon starting the application.

(9) The client device may retain the received application even after execution of the integrated service, and the application distribution unit may acquire, from the client device, an ID and a version of the application stored in the client device upon distributing the script data of the application, and distribute the script data of the application when the acquired ID and the version of the application do not coincide with the ID and the version of the application determined by the application determination unit.

According to the foregoing configuration, the application that is once distributed to a client device will only be re-sent when there is any change to the version of that application. Thus, the master device is not required to distribute the application to the client device each time the application is started.

(10) The integrated service information management unit may delete an integrated service, which fails to match the user's preference, from the integrated service information based on information that has been input by the user in advance.

According to the foregoing configuration, since the integrated service which fails to match the user's preference is deleted from the service information in advance, the integrated service information can be customized so that only the user's preferred integrated services are included.

(12) The master device may further comprise a network communication unit which accepts data to be sent from the device information acquisition unit, the connection management unit, the application distribution unit, and the integrated service life cycle management unit, and sends the data to the client device, and receives the data that is sent from the client device.

According to the foregoing configuration, the respective blocks configuring the master device will communicate with the client device via the network communication unit.

(12) The integrated service management system according to one mode of the present invention is an integrated service management system which manages, on an autonomous distributed network, an integrated service that is executed by causing a plurality of devices to coordinate with each other, the system comprising the master device, and one or more client devices connected to the master device via the autonomous distributed network, wherein the client device comprises a client-side connection management unit which receives a connection request from the master device and determines whether to establish a network connection with the master device, and notifies to the master device of a determination result, and a client-side life cycle management unit which starts the application distributed from the master device upon receiving a start request from the master device.

According to the foregoing configuration, it is possible to provide an integrated service management system capable of yielding the same effects as (1) above.

(13) Preferably, the application distribution unit of the master device distributes to the one or more client devices script data of the application determined by the application determination unit and causes the one or more client devices to store the same, and the client-side life cycle management unit may start the application distributed from the master device by reading the recorded script data upon receiving the start request.

According to the foregoing configuration, the same effects as (6) above are yielded.

(14) Preferably, the application distribution unit of the master device distributes a URI of the application determined by the application determination unit to the one or more client devices, and the client-side life cycle management unit starts the application by designating the URI distributed from the master device upon receiving the start request.

According to the foregoing configuration, the same effects as (7) above are yielded.

(15) Preferably, the devices comprise functions of both the master device and the client device, and, upon executing the integrated service, one device executes the function of the master device, and the remaining devices execute the function of the client device.

According to the foregoing configuration, it is possible to realize an integrated service by causing the device to function as the master device to execute the function of the master device and causing the device to function as the client device to execute the function of the client device.

The integrated service management system according to the present invention can be continuously or repetitively manufactured and sold in the manufacturing industry. In particular, the present invention can be used in the consumer equipment industry engaged in the production and execution of integrated services.

The invention claimed is:

1. A master device which manages, on an autonomous distributed network, an integrated service that is executed by causing a plurality of devices to coordinate with each other, the master device comprising:
   a non-transitory memory storing a program: and
   a hardware processor that executes the program, the program causing the master device to:
   manage, in relation to a plurality of integrated services, integrated service information that defines information pertaining to an application required by each of the devices for executing the respective integrated services and a specification requirement of each of the devices required for executing the application in correspondence with one another;
   acquire device information that defines a specification for a peripheral device from one or more peripheral devices detected via the autonomous distributed network;
   determine, among the peripheral devices, one or more client devices to be used in the integrated service, and establish a network connection with the one or more determined client devices;
   determine, among the integrated services defined by the integrated service information, an integrated service to be executed based on an instruction from a user;
   determine, by using the integrated service information, an application which corresponds to the integrated service to be executed an allows the device information related to the one or more client devices to satisfy the specification requirement;

distribute, to each of the one or more client devices, the application determined; and issue, to the one or more client devices, a start command of the application distributed, wherein each of the one or more client devices retains the received application even after execution of the integrated service, and in the distribution of the application determined, from each of the one or more client devices, an ID and a version of the application stored in each of the one or more client devices is acquired upon distributing script data of the application, and the script data of the application is distributed when the acquired ID and the version of the application do not coincide with the ID and the version of the application determined.

2. The master device according to claim 1, wherein in the determining of the integrated services to be executed, one or more executable integrated services are extracted based on the device information related to the one or more peripheral devices and the specification requirement defined by the integrated service information, the extracted integrated services are presented to the user, and the integrated service to be executed are determined based on an instruction from the user, and in the determining of the one or more client devices to be used in the integrated service, the one or more client devices to be used in the integrated service to be executed is determined based on the specification requirement of the integrated service to be executed and the device information related to the peripheral device.

3. The master device according to claim 1, wherein in the determining the one or more client devices to be used in the integrated service, the one or more client devices from among the peripheral devices are determined based on an instruction from the user, and in the determining of the integrated services to be executed, an executable integrated service is extracted based on the device information related to the one or more client devices and the specification requirement defined by the integrated service information, the extracted integrated services are presented to the user, and the integrated service to be executed are determined based on an instruction from the user.

4. The master device according to claim 1, wherein, when a certain client device has a plurality of applications that satisfy the specification requirement of the integrated service to be executed, the applications are presented to the user, and an application selected by the user is determined as the application to be distributed to the client device.

5. The master device according to claim 1, wherein the application includes a master application to be executed by the master device and a client application to be executed by the client device, and in the issuing of a start command of the application distributed, the master application and the client application are synchronously started.

6. The master device according to claim 1, wherein in the distributing of the application determined to each of the one or more client devices, the application is distributed to the one or more client devices by distributing script data of the application to the client devices.

7. The master device according to claim 1, wherein in the distributing of the application determined to each of the one or more client devices, a URI (Uniform Resource Identifier) of the application is distributed to the one or more client devices.

8. The master device according to claim 7, wherein in the distributing of the application determined to each of the one or more client devices, an ID of the integrated service to be executed and an ID of the application are sent upon sending the URI of the application, and in the issuing of a start command of the application distributed, a start command of the application is sent to each of the one or more client device by designating the ID of the integrated service to be executed or the ID of the application upon starting the application.

9. The master device according to claim 1, wherein in the managing of the integrated services, an integrated service, which fails to match the user's preference, is deleted from the integrated service information based on information that has been input by the user in advance.

10. The master device according to claim 1, wherein the hardware processor executes the program and the program causes the master device to:

send data to the one or more client devices, and receive the data that is sent from the one or more client devices.

11. An integrated service management system which manages, on an autonomous distributed network, an integrated service that is executed by causing a plurality of devices to coordinate with each other, the integrated service management system comprising:

a master device; and one or more client devices connected to the master device via the autonomous distributed network, wherein the master device includes:

a non-transitory memory storing a program; and a hardware processor that executes the program, the program causing the master device to:

manage, in relation to a plurality of integrated services, integrated service information that defines information pertaining to an application required by each of the devices for executing the respective integrated services and a specification requirement of each of the devices required for executing the application in correspondence with one another;

acquire device information that defines a specification for a peripheral device from one or more peripheral devices detected via the autonomous distributed network;

determine, among the peripheral devices, the one or more client devices to be used in the integrated service, and establish a network connection with the one or more determined client devices;

determine, among the integrated series defined by the integrated service information, an integrated service to be executed based on an instruction from a user;

determine, by using the integrated service information, an application which corresponds to the integrated service to be executed and allow the device information related to the one more client devices to satisfy the specification requirement;

distribute, to each of the one or more client devices, the application determined; and issue, to each of the one or more client devices, a start command of the application distributed, and each of the one or more client devices:

receives a connection request from the master device and determines whether to establish a network connection with the master device, and notifies the master device of a determination result; and starts the application distributed from the master device upon receiving a start request from the master device, wherein each of the one or more client devices retains the received application even after execution of the integrated service, and in the distribution of the application determined, from each of the one or more client devices, an ID and a version of the application stored in each of the one or more client devices is acquired upon distributing script data of the application, and the script data of the application is distributed when the acquired ID and the version of the application do not coincide with the ID and the version of the application determined.

12. The integrated service management system according to claim 11, wherein in the distributing of the application determined to each of the one or more client devices, script data of the application determined is distributed to the one or more client devices and the one or more client devices is caused to store the script data, and in the starting of the application distributed, the application distributed from the master device is started by reading the recorded script data upon receiving the start request.

13. The integrated service management system according to claim 11, wherein in the distributing of the application determined to each of the one or more client devices, a URI (Uniform Resource Identifier) of the application determined is distributed to the one or more client devices, and in the starting of the application distributed, the application is started by designating the URI distributed from the master device upon receiving the start request.

14. The integrated service management system according to claim 11, wherein the devices comprise functions of both the master device and each of the one or more client devices, and upon executing the integrated service, one device executes the function of the master device, and the remaining devices execute the function of each of the one or more client devices.

15. An integrated service management method performed by a master device which manages, on an autonomous distributed network, an integrated service that is executed by causing a plurality of devices to coordinate with each other, wherein the master device includes a non-transitory memory storing a program and a hardware processor that executes the program, the program causing the master device to manage, in relation to a plurality of integrated services, integrated service information that defines information pertaining to an application required by each of the devices upon executing the respective integrated services and a specification requirement of each of the devices required for executing the application in correspondence with one another, and the program causes the master device to perform steps of the integrated service management method comprising:

a device information acquisition step of the master device acquiring device information that defines a specification of a peripheral device from one or more peripheral devices detected via the autonomous distributed network;

a connection management step of the master device determining, from among the peripheral devices, one or more client devices to be used in the integrated service, and establishing a network connection with the determined one or more client devices;

an integrated service determination step of the master device determining, from among the integrated services defined by the integrated service information, an integrated service to be executed based on an instruction from a user;

an application determination step of the master device determining, by using the integrated service information, an application which corresponds to the integrated service to be executed and the device information related to the one or more client devices that satisfy the specification requirement;

an application distribution step of the master device distributing, to each of the one or more client devices, the application determined in the application determination step; and an integrated service life cycle management step of the master device issuing, to each of the one or more client devices, a start command of the application distributed in the application distribution step, and an application retaining step of each of the one or more client devices retaining the received application even after execution of the integrated service, wherein the application distribution step includes: acquiring, from each of the one or more client devices, an ID and a version of the application stored in each of the one or more client devices upon distributing script data of the application; and a distributing the script data of the application when the acquired ID and the version of the application do not coincide with the ID and the version of the application determined by the application determination unit.

* * * * *